(12) United States Patent
Asterjadhi et al.

(10) Patent No.: US 12,476,662 B2
(45) Date of Patent: Nov. 18, 2025

(54) METHODS FOR IMPROVING WIRELESS PERFORMANCE USING AUXILIARY RADIOS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Gaurang Naik, San Diego, CA (US); Yanjun Sun, San Diego, CA (US); Sai Yiu Duncan Ho, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 18/054,139

(22) Filed: Nov. 9, 2022

(65) Prior Publication Data

US 2024/0154636 A1 May 9, 2024

(51) Int. Cl.
*H04B 1/3805* (2015.01)
(52) U.S. Cl.
CPC .................. *H04B 1/3805* (2013.01)
(58) Field of Classification Search
CPC ..... H04W 88/06; H04W 84/12; H04W 48/18; H04W 52/46; H04W 4/18; H04W 40/02;
(Continued)

(56) References Cited

U.S. PATENT DOCUMENTS

| 8,040,942 | B2 * | 10/2011 | Bhushan | H04W 52/26 |
| | | | | 375/225 |
| 8,213,304 | B2 * | 7/2012 | Forssell | H04W 28/26 |
| | | | | 370/347 |

(Continued)

FOREIGN PATENT DOCUMENTS

WO  WO-2022028967 A1  2/2022

OTHER PUBLICATIONS

International Search Report and Written Opinion—PCT/US2023/037009—ISA/EPO—Mar. 1, 2024.

*Primary Examiner* — Golam Sorowar
(74) *Attorney, Agent, or Firm* — Holland & Hart LLP/Qualcomm

(57) ABSTRACT

Methods, systems, and devices for wireless communications are described. A wireless device that operates in a wireless local area network may include an auxiliary radio and a main radio and may operate in both an auxiliary radio mode and a main radio mode. The auxiliary radio may support both transmitting and receiving or may support receiving only. The wireless device may indicate parameters associated with an auxiliary radio mode and/or with transitioning from the auxiliary radio mode to a main radio mode. The auxiliary radio may perform additional functions while the wireless device communicates with a second wireless device on a wireless link using the main radio. For example, the auxiliary radio may monitor channel metrics of the wireless link, receive and/or transmit control communications with the second wireless device, receive and/or transmit high importance data communications, or scan for and/or initiate connections via other wireless channels.

30 Claims, 18 Drawing Sheets

(58) Field of Classification Search
CPC ..... H04W 52/38; H04W 76/22; H04W 28/14; H04W 40/00; H04W 72/12; H04W 76/10; H04W 8/005; H04W 52/0261; H04W 52/04; H04L 69/18; H04L 1/0025; H04L 9/40; H04L 1/0003; H04L 1/0002; H04L 1/1671; H04L 65/80; H04L 1/0032; H04L 1/1685; H04L 27/12; H04L 27/14; H04L 27/156; H04L 45/00; H04L 45/48; H04L 61/00; H04B 1/04; H04B 1/1615; H04B 7/0802; H04B 7/10; H04B 1/385; H04B 7/024; H04B 7/026; H04B 7/0452; H04B 7/0456; H04B 1/0003; H04B 7/0697; H04B 1/406; H04B 1/692; H04B 2201/70711; H04B 7/2606
See application file for complete search history.

(56) References Cited

U.S. PATENT DOCUMENTS

| | | | | |
|---|---|---|---|---|
| 8,982,856 | B2* | 3/2015 | Brownrigg | H04B 7/155 |
| | | | | 370/338 |
| 9,270,606 | B2* | 2/2016 | Benveniste | H04L 47/245 |
| 2018/0206193 | A1* | 7/2018 | Adachi | H04W 52/0235 |
| 2020/0196243 | A1 | 6/2020 | Kim et al. | |
| 2020/0344688 | A1* | 10/2020 | Lv | H04J 3/0682 |
| 2023/0269825 | A1* | 8/2023 | Handte | H04W 76/36 |
| | | | | 370/328 |

* cited by examiner

METHODS FOR IMPROVING WIRELESS PERFORMANCE USING AUXILIARY RADIOS

BACKGROUND

The following relates to wireless communications, including methods for improving wireless performance using auxiliary radios.

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

SUMMARY

The described techniques relate to improved methods, systems, devices, or apparatuses that support methods for improving wireless performance using auxiliary radios. Generally, the described techniques provide for a wireless device that operates in a wireless local area network (WLAN) that may include an auxiliary radio and a main radio and may operate in both an auxiliary radio mode and a main radio mode. The auxiliary radio may support both transmitting and receiving (Tx/Rx) or may support receiving only (Rx-only). The wireless device may indicate (via broadcast, for example) to other wireless devices parameters that are associated with an auxiliary radio mode and/or with transitioning from the auxiliary radio mode to a main radio mode for a given wireless link. For example, the wireless device may indicate a message format for the auxiliary radio mode. The wireless device may indicate a transition delay associated with a time to switch from the auxiliary mode to the main radio mode for a wireless link. A second wireless device may schedule data communications with the wireless device based on the transition delay. The transition delay may depend on whether the auxiliary radio supports Tx/Rx or Rx-only. The auxiliary radio may perform additional functions while the wireless device communicates with a second wireless device on a wireless link using the main radio. For example, the auxiliary radio may be used to monitor channel metrics of the wireless link, to receive and/or transmit control communications with the second wireless device, to receive and/or transmit high importance data communications (such as for redundancy purposes), or to scan for and/or initiate connections via other wireless channels. A method for wireless communications at a first wireless device is described. The method may include transmitting, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, receiving, from a second wireless device in communication with the first wireless device via the first radio on the wireless link, control signaling that triggers the transition from the auxiliary radio mode on the wireless link to the second radio mode on the wireless link, and receiving, from the second wireless device via the second radio on the wireless link while the first wireless device is in the second radio mode in response to the control signaling, a data packet in accordance with the one or more parameters.

An apparatus for wireless communications at a first wireless device is described. The apparatus may include a processor, memory coupled with the processor, and instructions stored in the memory. The instructions may be executable by the processor to cause the apparatus to transmit, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, receive, from a second wireless device in communication with the first wireless device via the first radio on the wireless link, control signaling that triggers the transition from the auxiliary radio mode on the wireless link to the second radio mode on the wireless link, and receive, from the second wireless device via the second radio on the wireless link while the first wireless device is in the second radio mode in response to the control signaling, a data packet in accordance with the one or more parameters.

Another apparatus for wireless communications at a first wireless device is described. The apparatus may include means for transmitting, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, means for receiving, from a second wireless device in communication with the first wireless device via the first radio on the wireless link, control signaling that triggers the transition from the auxiliary radio mode on the wireless link to the second radio mode on the wireless link, and means for receiving, from the second wireless device via the second radio on the wireless link while the first wireless device is in the second radio mode in response to the control signaling, a data packet in accordance with the one or more parameters.

A non-transitory computer-readable medium storing code for wireless communications at a first wireless device is described. The code may include instructions executable by a processor to transmit, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, receive, from a second wireless device in communication with the first wireless device via the first radio on the wireless link, control signaling that triggers the transition from the auxiliary radio mode on the wireless link to the second radio mode on the wireless link, and receive, from the second wireless device via the second radio on the wireless link while the first wireless device is in the second radio mode in response to the control signaling, a data packet in accordance with the one or more parameters.

In some examples of the method, apparatuses, and non-transitory computer-readable medium described herein, receiving the control information may include operations, features, means, or instructions for receiving the control signaling in a message format associated with the auxiliary radio mode, the one or more parameters including the message format.

In some examples of the method, apparatuses, and non-transitory computer-readable medium described herein, transmitting the indication of the one or more parameters may include operations, features, means, or instructions for transmitting an indication of a delay associated with the transition, receipt of the data packet being at a time subsequent to reception of the control signaling by at least the delay.

Some examples of the method, apparatuses, and non-transitory computer-readable medium described herein may further include operations, features, means, or instructions for transmitting an indication that the auxiliary radio mode may be associated with the second radio being in a sleep mode, the delay being associated with a transition of the second radio from the sleep mode.

Some examples of the method, apparatuses, and non-transitory computer-readable medium described herein may further include operations, features, means, or instructions for transmitting an indication that the auxiliary radio mode may be associated with the second radio operating on a second wireless link, the delay being associated with a transition of the second radio from the second wireless link to the wireless link.

Some examples of the method, apparatuses, and non-transitory computer-readable medium described herein may further include operations, features, means, or instructions for receiving, from the second wireless device on the wireless link, padding during a time period subsequent to receipt of the control signaling that corresponds to the delay, the padding being contained in a same packet that contains the control signaling or in a subsequent packet.

Some examples of the method, apparatuses, and non-transitory computer-readable medium described herein may further include operations, features, means, or instructions for transmitting, to the second wireless device via the first radio, an acknowledgement message responsive to the control signaling, the delay being associated with transmission of the acknowledgement message via the first radio and having a duration of at least one short interframe space.

Some examples of the method, apparatuses, and non-transitory computer-readable medium described herein may further include operations, features, means, or instructions for transmitting, to the second wireless device via the second radio, an acknowledgement message responsive to the control signaling, the delay being associated with transmission of the acknowledgement message via the second radio and having a duration of at least a set of multiple short interframe spaces, a transmission time of the acknowledgement message, and a preamble duration.

In some examples of the method, apparatuses, and non-transitory computer-readable medium described herein, scanning, via the first radio while communicate with the second wireless device on the wireless link in the second radio mode, a set of multiple channels.

Some examples of the method, apparatuses, and non-transitory computer-readable medium described herein may further include operations, features, means, or instructions for performing, via the first radio, an association procedure with a third wireless device via a channel of the set of multiple channels responsive to the scan of the set of multiple channels.

Some examples of the method, apparatuses, and non-transitory computer-readable medium described herein may further include operations, features, means, or instructions for identifying, via the first radio while in communication with the second wireless device on the wireless link in the second radio mode, one or more channel metrics of the wireless link.

Some examples of the method, apparatuses, and non-transitory computer-readable medium described herein may further include operations, features, means, or instructions for transmitting, via the first radio while in communication with the second wireless device on the wireless link in the second radio mode, an indication of one or more channel metrics.

Some examples of the method, apparatuses, and non-transitory computer-readable medium described herein may further include operations, features, means, or instructions for receiving one or more control messages from the second wireless device via the first radio on a second wireless link while operating in the auxiliary radio mode while communicating one or more data packets with the second wireless device via the second radio on the wireless link while operating in the second radio mode.

Some examples of the method, apparatuses, and non-transitory computer-readable medium described herein may further include operations, features, means, or instructions for receiving a set of data packets from the second wireless device via the second radio on the wireless link while operating in the second radio mode and receiving a subset of the set of data packets from the second wireless device via the first radio on a second wireless link while operating in the auxiliary radio mode.

Some examples of the method, apparatuses, and non-transitory computer-readable medium described herein may further include operations, features, means, or instructions for transmitting one or more data packets to the second wireless device via the first radio on a second wireless link while operating in the auxiliary radio mode while communicating one or more second data packets with the second wireless device via the second radio on the wireless link while operating in the second radio mode.

Some examples of the method, apparatuses, and non-transitory computer-readable medium described herein may further include operations, features, means, or instructions for transitioning, in response to the control signaling, from operation in the second radio mode on a second wireless link to operation in the auxiliary radio mode on the second wireless link and transitioning, in response to the control signaling, from operation in the auxiliary radio mode on the wireless link to operation in the second radio mode on the wireless link.

Some examples of the method, apparatuses, and non-transitory computer-readable medium described herein may further include operations, features, means, or instructions for receiving, from the second wireless device while operating in the second radio mode on the wireless link, second control signaling that triggers a second transition from the second radio mode on the wireless link to the auxiliary radio mode on the wireless link and transitioning, in response to the second control signaling, from operation in the second radio mode on the wireless link to operation in the auxiliary radio mode on the wireless link.

Some examples of the method, apparatuses, and non-transitory computer-readable medium described herein may further include operations, features, means, or instructions for transitioning, subsequent to reception of the data packet, from operation in the second radio mode on the wireless link to operation in the auxiliary radio mode on the wireless link.

Some examples of the method, apparatuses, and non-transitory computer-readable medium described herein may further include operations, features, means, or instructions for receiving an indication identifying that the second wireless device may be operating in the second radio mode on the wireless link and transitioning, in response to the identification, from operation in the auxiliary radio mode on the wireless link to operation in the second radio mode on the wireless link.

In some examples of the method, apparatuses, and non-transitory computer-readable medium described herein, communicating, on the wireless link while the first wireless device may be in the auxiliary radio mode prior to reception of the control signaling, one or more data packets in a message format associated with the auxiliary radio mode.

A method for wireless communications at a second wireless device is described. The method may include receiving, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, transmitting, to the first wireless device in communication with the second wireless device on the wireless link, control signaling that triggers the transition from the auxiliary radio mode on the wireless link to the second radio mode on the wireless link, and transmitting, to the first wireless device via the second radio on the wireless link subsequent to transmission of the control signaling, a data packet in accordance with the one or more parameters.

An apparatus for wireless communications at a second wireless device is described. The apparatus may include a processor, memory coupled with the processor, and instructions stored in the memory. The instructions may be executable by the processor to cause the apparatus to receive, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, transmit, to the first wireless device in communication with the second wireless device on the wireless link, control signaling that triggers the transition from the auxiliary radio mode on the wireless link to the second radio mode on the wireless link, and transmit, to the first wireless device via the second radio on the wireless link subsequent to transmission of the control signaling, a data packet in accordance with the one or more parameters.

Another apparatus for wireless communications at a second wireless device is described. The apparatus may include means for receiving, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, means for transmitting, to the first wireless device in communication with the second wireless device on the wireless link, control signaling that triggers the transition from the auxiliary radio mode on the wireless link to the second radio mode on the wireless link, and means for transmitting, to the first wireless device via the second radio on the wireless link subsequent to transmission of the control signaling, a data packet in accordance with the one or more parameters.

A non-transitory computer-readable medium storing code for wireless communications at a second wireless device is described. The code may include instructions executable by a processor to receive, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, transmit, to the first wireless device in communication with the second wireless device on the wireless link, control signaling that triggers the transition from the auxiliary radio mode on the wireless link to the second radio mode on the wireless link, and transmit, to the first wireless device via the second radio on the wireless link subsequent to transmission of the control signaling, a data packet in accordance with the one or more parameters.

In some examples of the method, apparatuses, and non-transitory computer-readable medium described herein, transmitting the control information may include operations, features, means, or instructions for transmitting the control signaling in a message format associated with the auxiliary radio mode, the one or more parameters including the message format.

In some examples of the method, apparatuses, and non-transitory computer-readable medium described herein, receiving the indication of the one or more parameters may include operations, features, means, or instructions for receiving an indication of a delay associated with the transition, transmission of the data packet being at a time subsequent to transmission of the control signaling by at least the delay.

Some examples of the method, apparatuses, and non-transitory computer-readable medium described herein may further include operations, features, means, or instructions for receiving, from the first wireless device, an indication that the auxiliary radio mode may be associated with the second radio being in a sleep mode, the delay being associated with a transition of the second radio from the sleep mode.

Some examples of the method, apparatuses, and non-transitory computer-readable medium described herein may further include operations, features, means, or instructions for receiving, from the first wireless device, an indication that the auxiliary radio mode may be associated with the second radio operating on a second wireless link, the delay being associated with a transition of the second radio from the second wireless link to the wireless link.

Some examples of the method, apparatuses, and non-transitory computer-readable medium described herein may further include operations, features, means, or instructions for transmitting, to the first wireless device, one or more padding frames during a time period subsequent to transmission of the control signaling corresponding to the delay.

Some examples of the method, apparatuses, and non-transitory computer-readable medium described herein may further include operations, features, means, or instructions for receiving, from the first wireless device on a second wireless link while in communication with the first wireless device on the wireless link, an indication of one or more channel metrics of the wireless link.

Some examples of the method, apparatuses, and non-transitory computer-readable medium described herein may further include operations, features, means, or instructions for transmitting, to the first wireless device, one or more control messages on a second wireless link while communicating one or more data packets with the first wireless device on the wireless link.

Some examples of the method, apparatuses, and non-transitory computer-readable medium described herein may further include operations, features, means, or instructions for transmitting, to the first wireless device, a set of data packets on the wireless link and transmitting, to the first wireless device, a subset of the set of data packets on a second wireless link.

Some examples of the method, apparatuses, and non-transitory computer-readable medium described herein may further include operations, features, means, or instructions for receiving one or more data packets from the first wireless device on a second wireless link while communicating one or more second data packets with the first wireless device on the wireless link.

DETAILED DESCRIPTION

Figure 1:
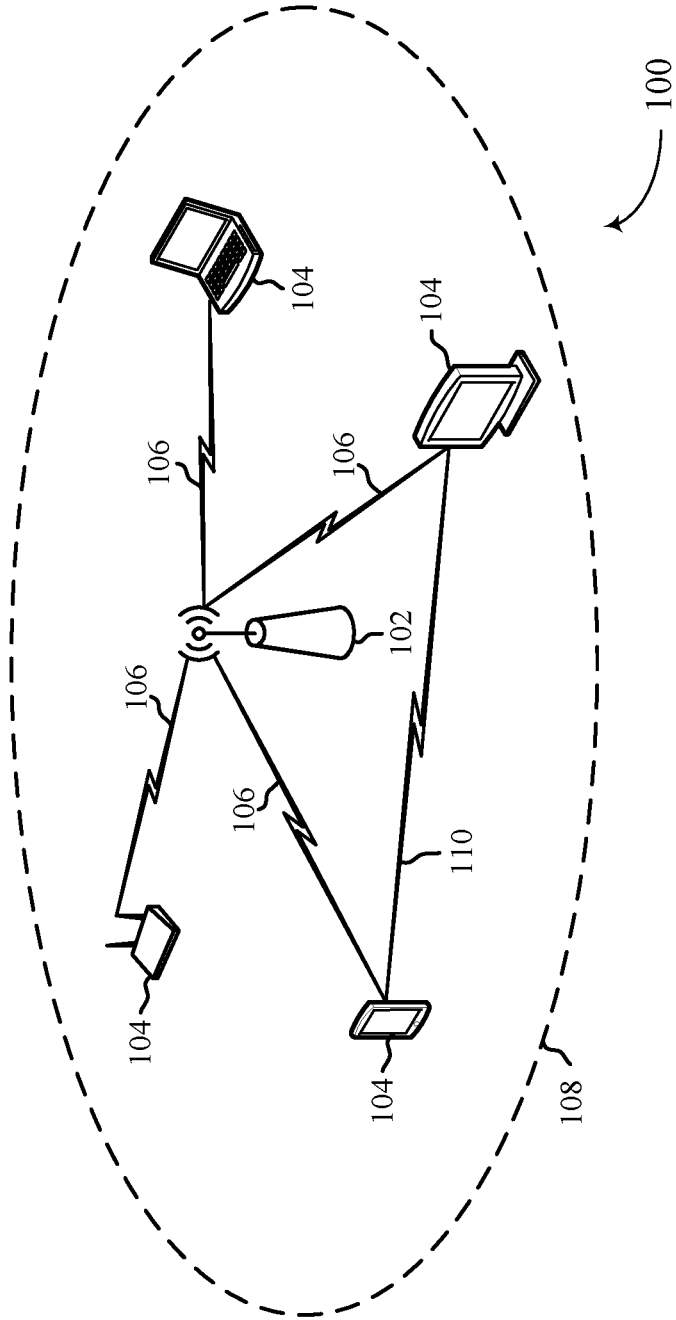
FIG. 1 illustrates a block diagram of an example wireless communication network that supports methods for improving wireless performance using auxiliary radios.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

A wireless device such as a station (STA) or an access point (AP) in a WLAN communicates with other wireless devices, such as other STAs or APs, via a main radio of the wireless device. To save power at the wireless device, the main radio may enter a sleep mode. The wireless device may include a wake up radio which monitors for and receives wake up signals. Reception of a wake up signal triggers the main radio to exit the sleep mode. Wake up radios, however, are only capable of receiving (not transmitting) and may be limited to receiving wake up radio frames. Some wireless devices support enhanced multi-link single radio (EMLSR) operation, where an auxiliary radio may monitor for an indication to transition the main radio from one wireless link to another wireless link. In an EMSLR operation, however, the only operation of the auxiliary radio is to monitor a wireless link for a control frame that indicates to switch the main radio to the wireless link. In EMLSR operation, the auxiliary radio is therefore only able to receive specific frames (such as initial control frames) while monitoring and is only able to support a receiving only (Rx-only) mode.

Various aspects of this disclosure relate generally to a wireless device that operates in a WLAN may include an auxiliary radio and a main radio and may operate in both an auxiliary radio mode and a main radio mode. The auxiliary radio mode may support lower data rate communications than the main radio mode. For example, a message format for the auxiliary radio mode may be non-high throughput (non-HT) PPDU) and/or a lower data rate such as <=24 Mbps. Some aspects more specifically relate to operation of the auxiliary radio and main radio, and the transitioning that happens between the auxiliary radio and main radio on wireless links, so as to introduce transitioning rules that apply to different types of auxiliary radios. In some examples, the auxiliary radio may support both transmitting and receiving (Tx/Rx mode of operation). In some other examples, the auxiliary radio may support receiving only (Rx-only mode of operation).

In some examples, the wireless device may support communications over a single wireless link or over multiple wireless links (the wireless device may be a multi-link device (MLD)). If the wireless device is an MLD, the wireless device may communicate on one wireless link using a main radio and may communicate on one or more other wireless links using one or more auxiliary radios. In an MLD scenario, the wireless device may transition the main radio from a second wireless link to a first wireless link and may correspondingly transition the auxiliary radio from the first wireless link to the second wireless link, for example in response to triggering control signaling received on the second wireless link via the auxiliary radio. In an MLD scenario where the auxiliary radio is Rx-only (Aux-Rx mode), the wireless device may transmit and receive communications on a first wireless link using the main radio and may receive communications on a second wireless link using the auxiliary radio. In an MLD scenario where the auxiliary radio is Tx/Rx capable (Aux-Tx/Rx), the wireless device may transmit and receive communications on a first wireless link using the main radio and may transmit and receive communications on a second wireless link using the auxiliary radio. In some other examples, where the wireless device is not an MLD, the wireless device may transition from an auxiliary radio mode to a main radio mode on a single wireless link, for example in response to triggering control signaling received on the wireless link via the auxiliary radio. The wireless device may be a STA or an AP. For example, the wireless device may be an AP MLD or a non-AP MLD (such as an STA capable of multi-link operation (MLO)).

In some examples, the wireless device may indicate (via broadcast, for example) to other wireless devices parameters that are associated with an auxiliary radio mode and/or with transitioning from the auxiliary radio mode to a main radio mode for a given wireless link. For example, the wireless device may indicate a message format for the auxiliary radio mode. For example, the indicated message format may indicate a PPDU format (such as non-HT PPDU) or a supported data rate (such as <=24 Mbps). As another example, the wireless device may indicate a transition delay associated with a time to switch from the auxiliary mode to the main radio mode for a wireless link. In some examples, a second wireless device may schedule data communications with the wireless device based on the transition delay. The transition delay may depend on whether the auxiliary radio supports Tx/Rx or Rx-only. For example, if the auxiliary radio supports Tx/Rx, the auxiliary radio may transmit an acknowledgment message in response to a request to transition to the main radio mode for a wireless link, which may extend the transition delay. Furthermore, the transition delay may depend on whether the main radio is transitioning from a sleep mode or a different wireless link.

Particular aspects of the subject matter described in this disclosure can be implemented to realize one or more of the following potential advantages. In some examples, the auxiliary radio, which may operate with reduced power consumption and cost, compared to the main radio, may perform additional functions while the wireless device communicates with a second wireless device via a wireless link using the main radio. In some examples, the wireless communication device may enable seamless passive scanning and passive statistics collection using the auxiliary radio via the second wireless link while the main radio is otherwise occupied communicating with the second wireless device via the wireless link. In some other examples, the auxiliary radio may be enabled to perform active scanning and roaming and also collect and report statistics without involvement of the main radio. In some other examples, the auxiliary radio can enable the wireless device to perform seamless active scanning and roaming. In some examples, the additional functions may further enable the wireless device to monitor ongoing traffic for attacks and/or collisions using the auxiliary radio. In some examples, the wireless communication device may enable auxiliary data receptions in parallel with main radio data transfer. In some other examples, the wireless communication device may enable auxiliary radio data transfer without involvement of the main radio in parallel with main radio data transfer. The additional functions may depend on whether the auxiliary radio supports Tx/Rx or Rx-only and/or whether the wireless device is an MLD or is capable of supporting communications over only a single wireless link. For example, in an Aux-Rx mode the auxiliary radio may be used to monitor channel metrics of the wireless link, and in an Aux Tx/Rx mode, the auxiliary radio may monitor channel metrics of the wireless link and transmit a report including the channel metrics using the auxiliary radio. In an Aux-Rx mode, an MLD may use the auxiliary radio receive control communications or high importance data communications (such as for redundancy purposes) with the second wireless device using a second wireless link, and in an Aux-Tx/Rx mode an MLD may use the auxiliary radio to receive and transmit control communications or high importance data communications. In an Aux-Rx mode, an MLD may scan for connections via other wireless channels, and in an Aux-Tx/Rx mode an MLD may scan for and initiate connections on other wireless channels using the auxiliary radio.

Aspects of the disclosure are initially described in the context of a wireless communication network. Aspects of the disclosure are further illustrated by and described with reference to PDUs, PPDUs, wireless communications systems, timing diagrams, and process flows. Aspects of the disclosure are further illustrated by and described with reference to apparatus diagrams, system diagrams, and flowcharts that relate to methods for improving wireless performance using auxiliary radios FIG. 1 illustrates a block diagram of an example wireless communication network that supports methods for improving wireless performance using auxiliary radios in accordance with aspects of the present disclosure. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PPDUs. The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

A wireless device (such as a STA 104) that operates in a WLAN may include an auxiliary radio and a main radio and may operate in both an auxiliary radio mode and a main radio mode. The auxiliary radio may support both Tx/Rx or may support Rx-only. The wireless device may indicate (via broadcast, for example) to other wireless devices (such as other STAs 104 or an AP 102) parameters that are associated with an auxiliary radio mode and/or with transitioning from the auxiliary radio mode to a main radio mode for a given wireless link. For example, the wireless device may indicate a message format for the auxiliary radio mode. For example, the indicated message format may indicate a PPDU format (such as non-HT PPDU) or a supported data rate (such as <=24 Mbps). As another example, the wireless device may indicate a transition delay associated with a time to switch from the auxiliary mode to the main radio mode for a wireless link. A second wireless device may schedule data communications with the wireless device based on the transition delay. The transition delay may depend on whether the auxiliary radio supports Tx/Rx or Rx-only. For example, if the auxiliary radio supports Tx/Rx, the auxiliary radio may transmit an acknowledgment message in response to a request to transition to the main radio mode for a wireless link, which may extend the transition delay. Further the transition delay may depend on whether the main radio is transitioning from a sleep mode or a different wireless link. The auxiliary radio may perform additional functions while the wireless device communicates with a second wireless device via a wireless link using the main radio. For example, the auxiliary radio may be used to monitor channel metrics of the wireless link, to receive and/or transmit control communications with the second wireless device, to receive and/or transmit high importance data communications (such as for redundancy purposes), or to scan for and/or initiate connections via other wireless channels.

Figure 2:
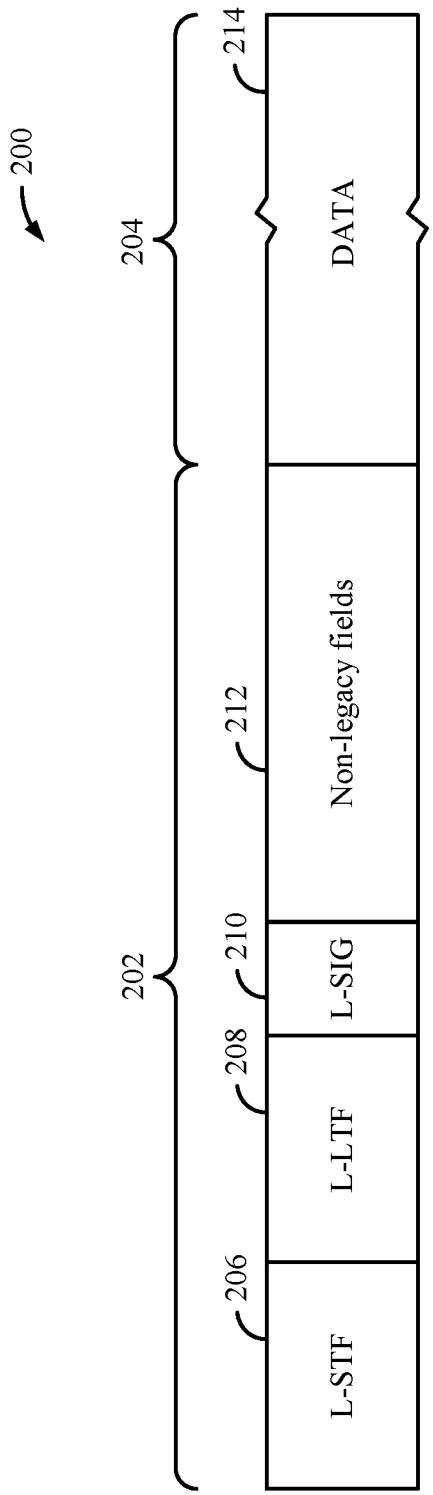
FIG. 2 illustrates an example protocol data unit (PDU) usable for communications between a wireless access point (AP) and one or more wireless stations (STAs) that support methods for improving wireless performance using auxiliary radios.

FIG. 2 illustrates an example protocol data unit (PDU) 200 usable for wireless communication between a wireless AP 102 and one or more wireless STAs 104 that supports methods for improving wireless performance using auxiliary radios. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The payload 204 may include a PSDU including a data field (DATA) 214 that, in turn, may carry higher layer data, for example, in the form of MAC protocol data units (MPDUs) or an aggregated MPDU (A-MPDU). Two STAs 104 may communicate directly via a direct wireless link regardless of whether both STAs 104 are in the same coverage area 108. Examples of direct wireless links may include Wi-Fi Direct connections, Wi-Fi Tunneled Direct Link Setup (TDLS) links, and other group connections. STAs 104 and APs 102 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 104 (or an AP 102) may be detectable by a central AP 102, but not by other STAs 104 in the coverage area 108 of the central AP 102. For example, one STA 104 may be at one end of the coverage area 108 of the central AP 102 while another STA 104 may be at the other end. Thus, both STAs 104 may communicate with the AP 102, but may not receive the transmissions of the other. This may result in colliding transmissions for the two STAs 104 in a contention based environment (such as CSMA/CA) because the STAs 104 may not refrain from transmitting on top of each other. A STA 104 whose transmissions are not identifiable, but that is within the same coverage area 108 may be known as a hidden node. CSMA/CA may be supplemented by the exchange of a Request-to-Send (RTS) packet transmitted by a sending STA 104 (or AP 102) and a Clear-to-Send (CTS) packet transmitted by the receiving STA 104 (or AP 102). This may alert other devices within range of the sender and receiver not to transmit for the duration of the primary transmission. Thus, RTS/CTS may help mitigate a hidden node problem.

Figure 3:
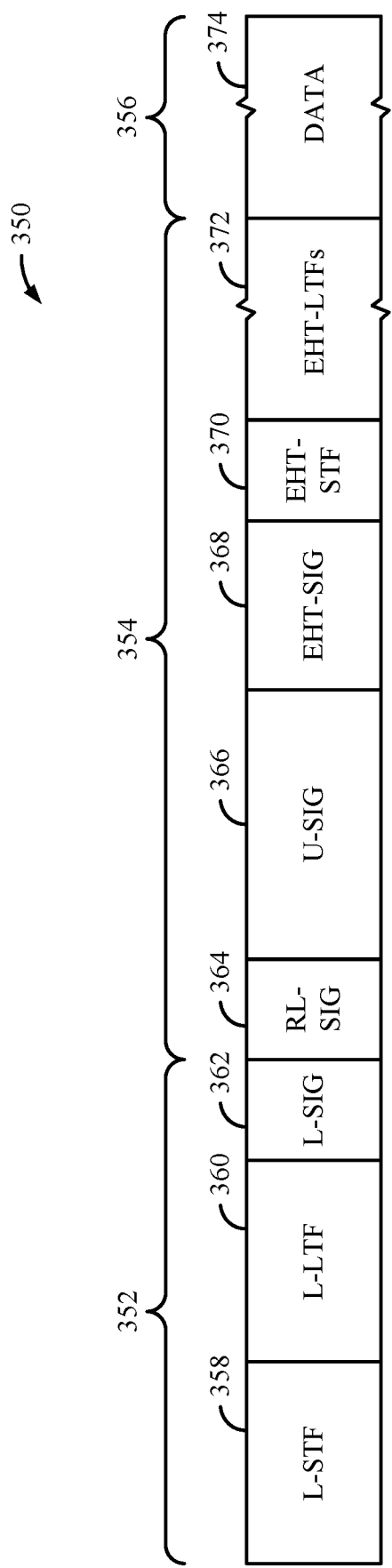
FIG. 3 illustrates an example physical PDU (PPDU) usable for communications between a wireless AP and one or more wireless STAs that support methods for improving wireless performance using auxiliary radios.

FIG. 3 illustrates an example PPDU 350 usable for wireless communication between a wireless AP and one or more wireless STAs that supports methods for improving wireless performance using auxiliary radios. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

Figure 4:
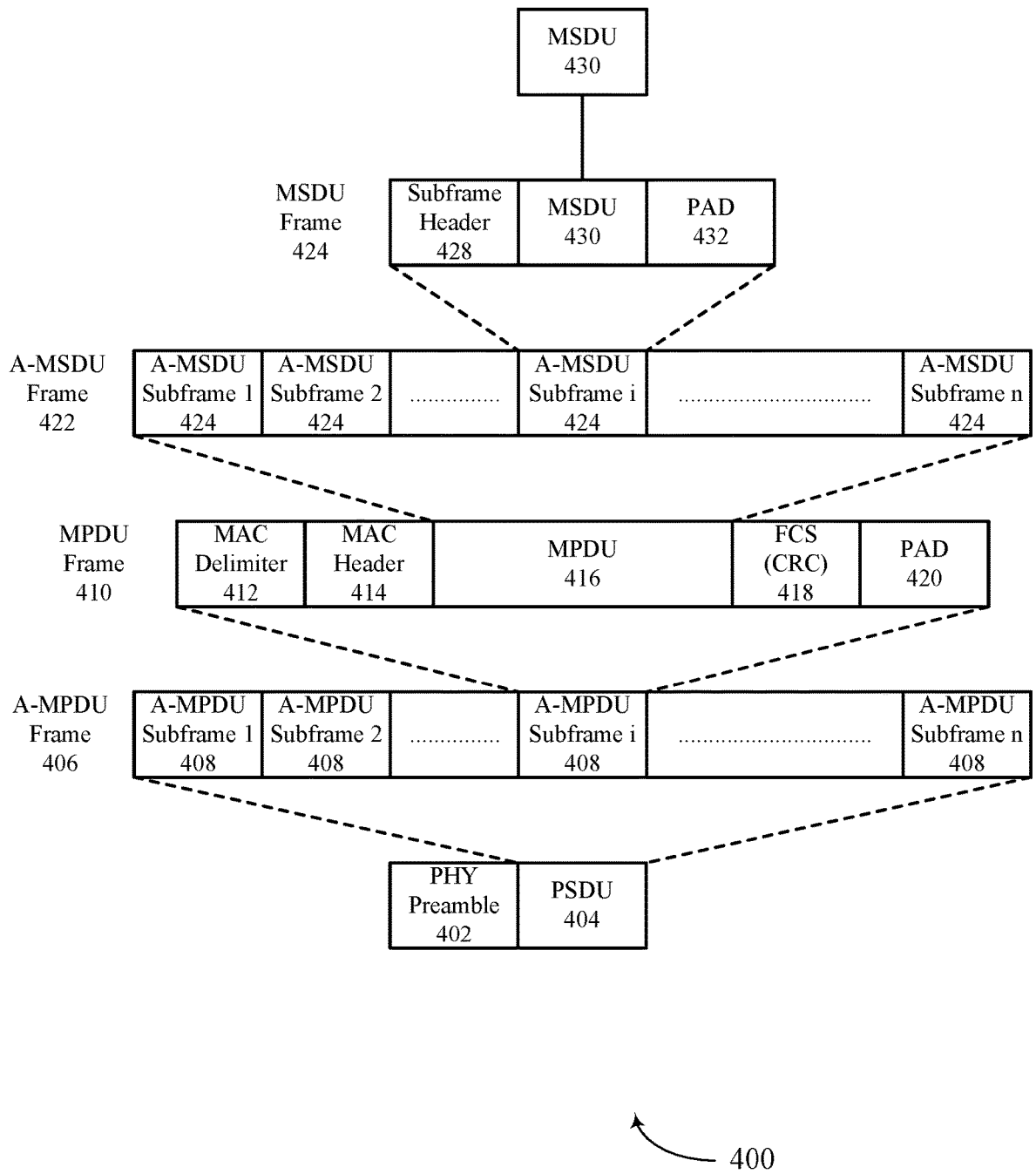
FIG. 4 illustrates a hierarchical format of an example PPDU usable for communications between a wireless AP and one or more wireless STAs that support methods for improving wireless performance using auxiliary radios.

FIG. 4 illustrates a hierarchical format of an example PPDU 400 usable for communications between a wireless AP 102 and one or more wireless STAs 104 that supports methods for improving wireless performance using auxiliary radios. As described, each PPDU 400 includes a PHY preamble 402 and a PSDU 404. Each PSDU 404 may represent (or "carry") one or more MPDUs 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432. For example, a transition delay may occur between a first time when a transition is triggered on a wireless link from an auxiliary radio mode to a main radio mode and a second time when the transition is complete (when the wireless device is ready to transmit/receive on the wireless link using the main radio). As described with reference to FIGS. 5 and 6, padding bits 432 (such as, zeros) may be transmitted during the transition delay so that data is not transmitted to the wireless device during the transition delay, which during which data may be lost.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a MLD. For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 5:
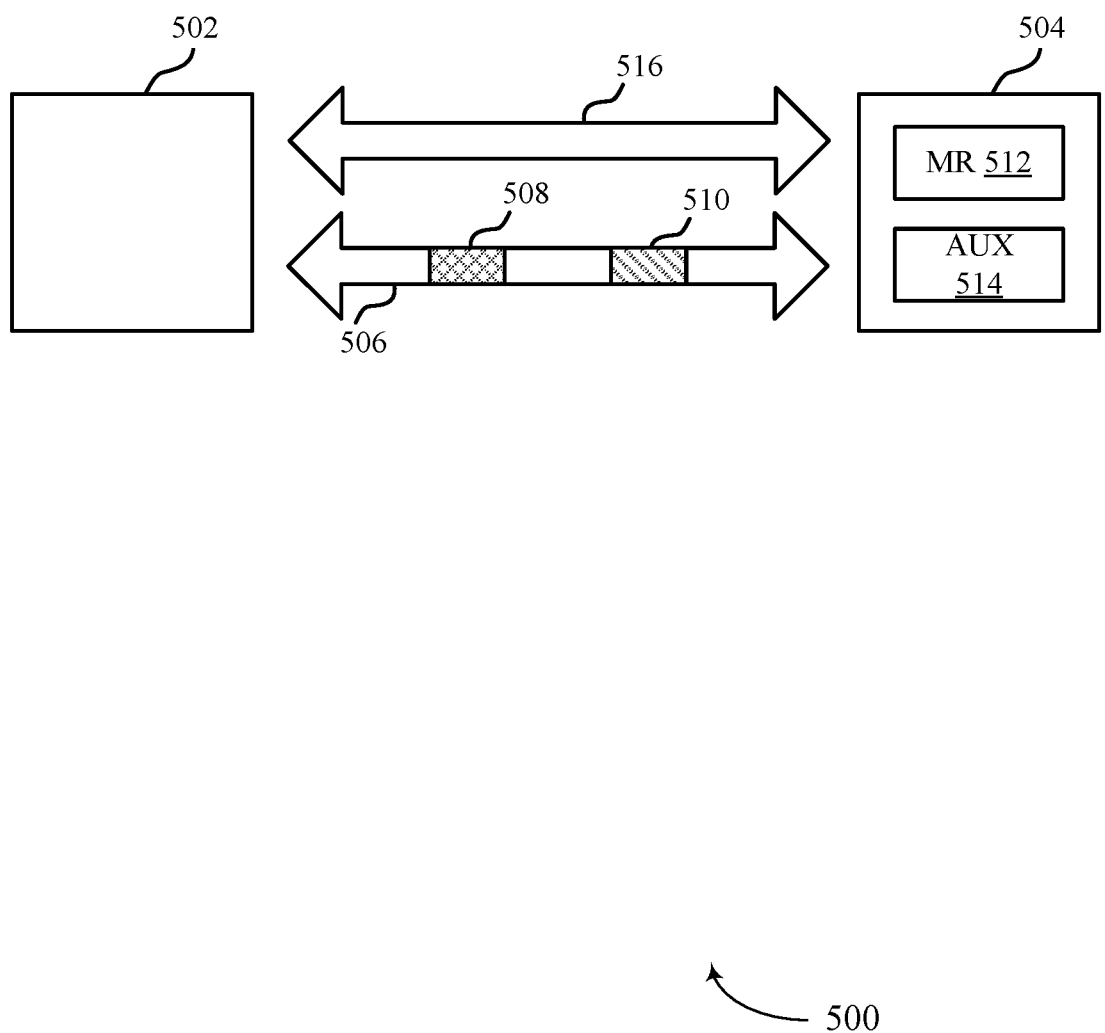
FIG. 5 illustrates an example wireless communications system that includes a first wireless device that includes an auxiliary radio and a main radio, and a second wireless device in communication with the first wireless device.

FIG. 5 illustrates a wireless communications system 500 that supports methods for improving wireless performance using auxiliary radios. The wireless communications system 500 may implement or be implemented by one or more aspects of the WLAN 100. For example, the wireless communications system 500 may include a first wireless device 504, which may be an example of an STA 104 described herein, and a second wireless device 502, which may be an example of the wireless AP 102. In some examples, the first wireless device 504 may be an AP 102 as described herein (such as and the second wireless device 502 may be another AP 102 or an STA 104). The wireless communications system 500 may represent communications between the second wireless device 502 and the first wireless device 504 on a wireless link 506, which may be an example of a communication link 106 described herein. In some examples, the wireless communications system 500 may represent communications between the second wireless device 502 and the first wireless device 504 on a single wireless link (such as the communication link 506). In some examples, the second wireless device 502 and the first wireless device 504 may be MLDs, for example, the second wireless device 502 and the first wireless device 504 may communicate via multiple wireless links (such as the communication link 506 and the communication link 516).

The first wireless device 504 and the second wireless device 502 may function and communicate via the wireless link 506 according to one or more of the IEEE 802.11 family of wireless communication protocol standards. The first wireless device 504 and the second wireless device 502 may transmit and receive wireless communications to and from one another in the form of PPDUs. In some examples, the wireless communications may include control messages 508, such as control signaling, and data packets 510.

In some examples, the first wireless device 504 may include a main radio 512 and an auxiliary radio 514 (or multiple auxiliary radios). The main radio 512 and auxiliary radio 514 may be part of the same physical device or logical entity. A main radio, such as the main radio 512, refers to a radio used by a wireless device, such as the first wireless device 504, for primary data and control communications. An auxiliary radio, such as the auxiliary radio 514 of the first wireless device 504, refers to a radio in addition to a main radio at a wireless device that has less PHY and/or MAC capabilities than the main radio 512. For example, auxiliary radios 514 may have a lower power consumption, lower complexity and lower cost than main radios 512. The combination of the main radios 512 and auxiliary radios 514 may improve reliability, latency, power consumption, throughput, and spectrum efficiency. For example, an auxiliary radio 514 may be used to improve reliability by using the auxiliary radio 514 to transmit/receive redundancies for high importance packets. As another example, an auxiliary radio 514 may be used to improve latency by using the auxiliary radio 514 to scan for channels while communicating on another channel via the main radio 512, thereby reducing latency associated with a transition between channels by eliminating the time for the main radio 512 to scan for channels. As another example, inclusion of an auxiliary radio 514 may reduce power consumption by enabling the main radio to enter a sleep mode, and then monitoring for wake up signals via the auxiliary radio 514 which consumes less power than the main radio 512.

In some examples, the first wireless device 504 may include an auxiliary radio 514 and a main radio 512 and may operate in both an auxiliary radio mode and a main radio mode. In the auxiliary radio mode for the wireless link 506, the auxiliary radio 514 may be active and the main radio 512 may be inactive. In the main radio mode for the wireless link 506, the main radio 512 may be active. In some examples, transitioning rules for transitioning from the auxiliary radio mode to the main radio mode may apply to different types of auxiliary radios. For example, the auxiliary radio 514 may support both transmitting and receiving (Tx/Rx) or may support receiving only (Rx-only).

In some examples, the first wireless device 504 may indicate, via a message 508, to the second wireless device 502 parameters that are associated with an auxiliary radio mode and/or with transitioning from the auxiliary radio mode to a main radio mode for the wireless link 506. In some examples the message 508 indicating the parameters may be broadcast. For example, the first wireless device 504 may indicate a message format for the auxiliary radio mode. In some examples, the indicated message format may provide a PPDU format (such as non-HT PPDU) or a supported data rate (such as <=24 Mbps).

In some examples, the first wireless device 504 may indicate a transition delay associated with a time to switch from the auxiliary mode to the main radio mode for the wireless link 506. The second wireless device 502 may schedule data communications with the first wireless device 504 based on the transition delay. In some examples, the transition delay may depend on whether the auxiliary radio 514 supports Tx/Rx or Rx-only. For example, if the auxiliary radio 514 supports Tx/Rx, the auxiliary radio 514 may transmit an acknowledgment message in response to a request to transition to the main radio mode for the wireless link 506, which may extend the transition delay. Further the transition delay may depend on whether the main radio 512 is transitioning from a sleep mode or a different wireless link. Accordingly, the first wireless device 504 may indicate a transition delay corresponding to whether the auxiliary radio supports Tx/Rx or Tx-only and/or whether the main radio 512 is transitioning from a sleep mode or operation on another wireless link. The second wireless device 502 may transmit control signaling on the wireless link 506 that triggers a transition at the first wireless device 504 from the auxiliary radio mode on the wireless link to the second radio mode on the wireless link 506. The first wireless device receives the control signaling in the auxiliary radio mode and initiates a transition to the main radio mode on the wireless link. The second wireless device 502 may then transmit a data packet 510 to the first wireless device, which the first wireless device 504 receives in the main radio mode. The time at which the second wireless device 502 transmits the data packet 510 after transmission of the control signaling triggering the transition at the first wireless device 504 is at least as large as the indicated transition delay.

In some examples, the first wireless device 504 may include a wake up radio (WUR) as defined in the IEEE 802.11ba protocol (such as instead of an auxiliary radio 514). For example, the first wireless device 504 in the wireless communications system 500 may communicate with the second wireless device 502 via the main radio 512. To save power at the first wireless device 504, the main radio 512 may enter a sleep mode. For example, the WUR may monitor for and receive WUR signals or frames as defined in the IEEE 802.11ba protocol. The WUR of the first wireless device 504 may operate in the 2.4 GHz and/or 5 GHz frequency bands and may be capable of receiving the WUR signals or frames. Reception of a WUR signal by the WUR may trigger the main radio 512 to exit the sleep mode and wake up or perform an operation.

In some examples, the WUR may consume low power, such as less than 1 milliwatt (mW). The range of the WUR may be comparable to mainstream Wi-Fi, such as IEEE 802.11a/b/g/n. The architecture or design of the wake up radio (such as auxiliary radio 514) may be simple with a small set of MAC and PHY parameters. The WUR frames may have a 6 bytes long general MPDU format. The WUR frames may have a low data rate (LDR) of 62.5 kilobytes per second (Kbps) or a high data rate (HDR) of 250 Kbps.

In some examples, WUR channels may be used as receiving control channels. The WUR may be Rx-only capable and not capable of transmitting signals. The second wireless device 502 may send WUR PPDUs as downlink transmissions to the first wireless device 504. The WUR PPDUs may carry information, such as a WUR beacon, a WUR Wake Up, and WUR Discovery. However, the WUR may not be able to acknowledge a received WUR PPDU (such as by transmitting another WUR PPDU) as the WUR is Rx-only. The WUR PPDUs may use significant airtime, such as approximately 1 millisecond (ms) with standard settings. Additionally, the WUR may not be natively supported by some mainstream Wi-Fi devices.

In some examples, the auxiliary radio 514 may be a Sub One GHz (S1G) radio. The S1G radio is defined in the IEEE 802.11ah protocol, and the S1G radio may provide sub 1 GHz Wi-Fi functionalities. The first wireless device 504 including the auxiliary radio 514 as the S1G radio may operate below 1 GHz and may support bandwidths of 1 MHz, 2 MHz, and up to 16 MHz. These supported narrow bandwidths may have no requirement for power amplifiers, and may be optimized protocols for sensor or IoT operations. The S1G radio may be fully Tx/Rx capable.

In some examples, the S1G radio may provide a data rate of 150 Kbps. The S1G radio may provide a longer transmission (Tx) range than mainstream Wi-Fi devices, such as IEEE 802.11a/b/g/n. This longer Tx range may increase communication coverage may be used to expand the control signaling delivery of APs 102 and may assist for deploying or enabling cooperation of APs 102, such as small cell deployment with common control channels. The S1G radio may provide more than 6 dB of additional link budget, and link budget gains may increase with increasing operating bands. The S1G radio as the auxiliary radio 514 may consume less power than the main radio 512. The S1G communications link may be robust and may operate when other communications links of the MLD are unavailable.

In some examples, the S1G channels may be used as control channels. The S1G bands may be considered greenfield from an IEEE802.11 perspective; however in some jurisdictions, there may be limited channel availabilities. The S1G channels may have several restricted access protocols for control access. The S1G radio may be considered as having little legacy and design scrutiny in terms of controlled or scheduled access. The S1G radio may not operate on the same link as a main radio 512 that operates in the above 1 GHz bands, so the first wireless device 504 with the S1G radio as the auxiliary radio 514 may be required to support MLO. The S1G radio may require new hardware for the first wireless device 504 because the S1G radio may not be natively supported by mainstream Wi-Fi devices, such as IEEE 802.11a/b/g/n.

In some examples, the first wireless device 504 may support EMLSR. EMLSR may be a multi-link operation mode during which a non-AP MLD (such as the first wireless device 504) may monitor a set of EMLRS wireless links (such as the wireless link 506) for a control frame that indicates to transition the main radio 512 from one wireless link (such as another wireless link 516) to another wireless link (such as the wireless link 506). The control frame may be defined as an initial control frame of a multi-user request to send (MU-RTS) trigger frame or a buffer status report poll (BSRP) trigger frame. The MU-RTS trigger frame and the BSRP trigger frame may be sent in a non-HT duplicate PPDU using a rate of 6, 12, or 24 Mbps on 1 spatial stream (SS). The control frame may include MPDU padding to provide a transition delay that ranges between 0 to 256 microseconds (us). In some examples, the main radio 512 may respond to a received initial control frame with a control response frame using 1 SS in transmission, full bandwidth and either a non-HT PPDU or a trigger based (TB) PPDU. The control response frame may be sent by the main radio 512 affiliated with the auxiliary radio 514 that received the initial control frame. The responding main radio 512 may then operate as fully Tx/Rx capable for the rest of the frame exchange. From an auxiliary radio perspective, the eMLSR MLD (such as the first wireless device 504) may consists of one or more auxiliary radios 514 radios that are Rx-only capable to listen for the initial control frame. The main radio 512 may have a transition time delay to be able to transition to the link being polled in order to send a response, such as a clear to send (CTS) or TB PPDU, and complete exchanges.

In some examples, the auxiliary radio 514 may be a radio as defined in the IEEE 802.11a protocol (the first amendment defined for mainstream Wi-Fi). The radio defined in the IEEE 802.11a protocol may operate in the 5 GHz band and may support 20 MHz bandwidth and 1 SS. The radio defined in the IEEE 802.11a protocol may operate with a reduced set of data rates, such as up to 24 Mbps. The radio defined in the IEEE 802.11a protocol may support the PPDU format of non-HT PPDU. Additionally, the radio defined in IEEE 802.11a protocol may provide low power consumption and a simple design as compared to other to mainstream Wi-Fi protocol radios, such as IEEE 802.11b/g/n. The radio defined in IEEE 802.11a protocol may be natively supported by other mainstream Wi-Fi protocol radios, such as IEEE 802.11b/g/n. In some examples, the radio defined in IEEE 802.11a protocol may provide basis for designing functionalities for EMLSR operation. The auxiliary radio 514 as a radio as defined in the IEEE 802.11a protocol may have two modes of operation: mode 1 as Rx-only capable and mode 2 as Tx/Rx capable.

In some examples, the auxiliary radio 514 of the first wireless device 504 and the second wireless device 502 may have a message format for the auxiliary radio mode. For example, the message format may be a PPDU format (such as non-HT PPDU) and a supported data rate (such as <=24 Mbps). The auxiliary radio mode may support MPDU padding and PPDU duration. The auxiliary radio mode may solicit an on-demand transition to the main radio mode which has full Tx/Rx capabilities. In some examples, the auxiliary radio 514 may have two modes of operation: an auxiliary Rx (AUX-Rx) mode and an auxiliary Tx/Rx (Aux-Tx/Rx) mode. In the Aux-Rx mode, the auxiliary radio may only receive packets, and may not transmit packets. In the Aux-Tx/Rx mode, the auxiliary radio may both receive and transmit transmissions packets. In some examples, the first wireless device 504 may be capable of communicating only on a single wireless link, such as the wireless link 506. On a single wireless link 506, the first wireless device 504 may transition between an auxiliary radio mode using the auxiliary radio 514 (and a corresponding sleep mode for the main radio 512) and a main radio mode using the main radio for the wireless link 506. In some examples, the first wireless device 504 may be capable of MLO, for example the first wireless device 504 may be an MLD (such as an AP MLD or a non-AP MLD (such as an STA capable of MLO)). In scenarios where the first wireless device 504 is an MLD, the first wireless device 504 may communicate with the second wireless device 502 on the wireless link 506 and the wireless link 516. For example, the first wireless device 504 may communicate with the second wireless device 502 on the wireless link 506 in the main radio mode and the wireless link 516 in the auxiliary radio mode, or vice versa, and the first wireless device 504 may transition between the auxiliary radio mode and the main radio mode on the wireless links 506 and 516.

In some examples, the AUX-Rx mode of the auxiliary radio 514 may support a transition from the auxiliary radio 514 to the main radio 512 to occur a short interframe space (SIFS) after reception of a soliciting PPDU that indicates for the first wireless device 504 to transition from the auxiliary radio mode to the main radio mode for the wireless link 506. In some examples, the auxiliary radio 514 and main radio 512 may operate on a single wireless link (such as the wireless link 506).

In some examples, the Aux-Tx/Rx mode of the auxiliary radio 514 may support a transition from the auxiliary radio 514 to the main radio 512 to occur within 2*SIFS+CTRL_RSP+L_PHY_DUR after reception of a PPDU that indicates for the first wireless device 504 to transition from the auxiliary radio mode to the main radio mode for the wireless link 506. CTRL_RSP refers to the time to transmit an acknowledgment message for the soliciting PPDU (such as a CTS), and L_PHY_DUR refers to a legacy preamble duration of 20 microseconds. In the Aux-Tx/Rx mode, the auxiliary radio 514 may use signaling similar to EMLSR operation.

To reduce power consumption and cost, AUX-Rx mode of the auxiliary radio 514 may enable discovery or roaming, statistics collection, security or collision detection and/or auxiliary Rx channels via the auxiliary radio 514 while the first wireless device 504 communicates on the wireless link 506 using the main radio 512. For discovery or roaming, the AUX-Rx mode may enable seamless passive scanning with the auxiliary radio 514 scanning off-channel (such as other channels than the wireless link 506) while communicating on the wireless link 506 via the main radio 512, and the first wireless device 504 may identify candidate APs or new channels to switch to based on the scanning via the auxiliary radio 514. In some examples, the auxiliary radio 514 may operate in an anchor channel (such as on the wireless link 516) with limited allowed activity, such as passive scanning and group addressed delivery while the first wireless device 504 communicates on the wireless link 506 via the main radio 512. For statistics collection, the AUX-Rx mode may enable seamless passive statistics collection via the auxiliary radio for the wireless link 506, such as channel quality information, BSS load, interference profiles of neighboring BSSs and multi-NAV multi-primary maintenance, while the first wireless device 504 communicates on the wireless link 506 via the main radio 512. For security or collision detection, the AUX-Rx mode may enable the auxiliary radio 514 to monitor ongoing traffic for attacks or collisions on the wireless link 506 while the main radio 512 may be unable to detect any attacks or collisions that might be happening while the main radio 512 is busy receiving or transmitting PPDUs. For auxiliary Rx channels (such as on another wireless link 516), the AUX-Rx mode may enable the auxiliary radio 514 to receive transmissions in parallel with main radio 512 data transfer. For example, the AUX-Rx mode may enable the auxiliary radio 514 to receive cross link control for PPDU acknowledgments, fast link adaptation and dynamic resource allocation on the wireless link 516 for data communications via the main radio 512 on the wireless link 506. The AUX-Rx mode may also enable the auxiliary radio 514 to receive redundancy transmissions on the wireless link 516 and prioritize by receiving redundant transmissions to increase reliability and robustness of ongoing main radio communications on the wireless link 506. For example, the second wireless device may transmit high priority transmissions on both the wireless link 506 and the wireless link 516 to increase reliability.

An Aux-Tx/Rx mode of the auxiliary radio 514 may enable discovery or roaming, statistics collection exchanges, auxiliary channels, and/or data transfer via the auxiliary radio 514 while the first wireless device 504 communicates on the wireless link 506 using the main radio 512. For discovery or roaming, the Aux-Tx/Rx mode may enable seamless active scanning with the auxiliary radio 514 actively scanning off-channel (such as other channels than the wireless link 506), and the first wireless device 504 may identify candidate APs or new channels to switch to based on the scanning via the auxiliary radio 514. The auxiliary radio 514 may perform association and authentication with a new APs while the main radio 512 is still operating with a different AP (such as communicating on the wireless link 506). For statistics collection exchanges, the Aux-Tx/Rx mode may enable the auxiliary radio 514 to collect and report statistics, such as channel quality information, BSS load, interference profiles of neighboring BSSs and multi-NAV multi-primary maintenance, without involvement of the main radio 512 while the first wireless device 504 communicates on the wireless link 506 via the main radio 512. The first wireless device may report the statistics to the second wireless device using the auxiliary radio 514 (such as via the wireless link 516) while the first wireless device 504 communicates on the wireless link 506 via the main radio 512. For auxiliary channels, the Aux-Tx/Rx mode may enable the auxiliary radio 514 to transmit and receive in parallel with main radio 512 data transfer. For example, the Aux-Tx/Rx mode may enable the auxiliary radio 514 to transmit and receive cross link control exchanges for PPDU acknowledgments, fast link adaptation and dynamic resource allocation on the wireless link 516 for data communications via the main radio 512 on the wireless link 506. The Aux-Tx/Rx mode may also enable the auxiliary radio 514 to exchange redundancy information to increase reliability and robustness of ongoing main radio receptions and transmissions. For example, The Aux-Tx/Rx mode may also enable the auxiliary radio 514 to transmit or receive redundancy transmissions on the wireless link 516 and prioritize by transmitting or receiving redundant transmissions to increase reliability and robustness of ongoing main radio communications on the wireless link 506. For data transfers, the Aux-Tx/Rx mode may enable the auxiliary radio 514 to exchange sporadic or low data rate frame transmissions without involvement of the main radio 512. For example, the auxiliary radio 514 may transmit short frame exchanges or bursts and may request transition to the main radio 512 for long frame exchanges or bursts.

Figure 6A:
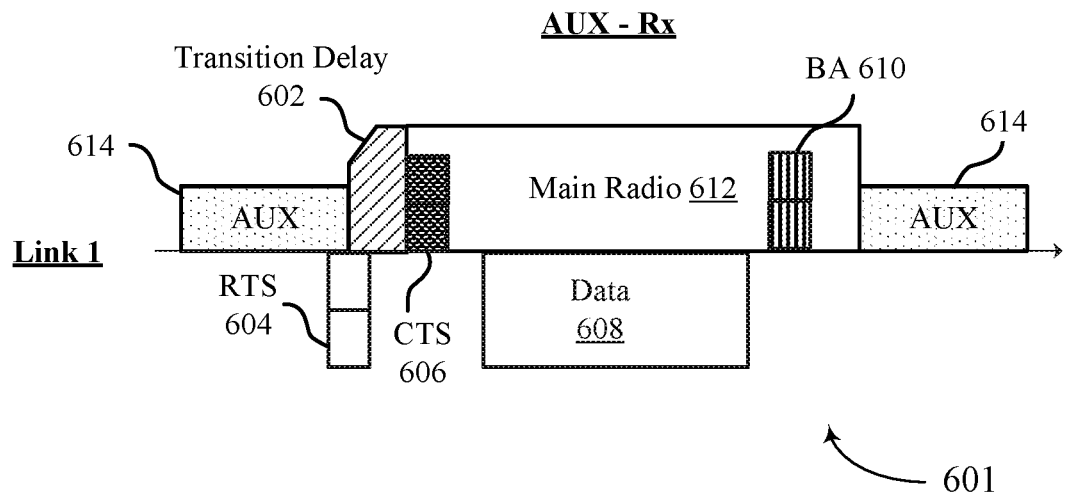
FIG. 6A illustrates an example of a timing diagram that illustrates communications over a single wireless link at a wireless device that includes a main radio and a receive-only capable auxiliary radio.
Figure 6B:
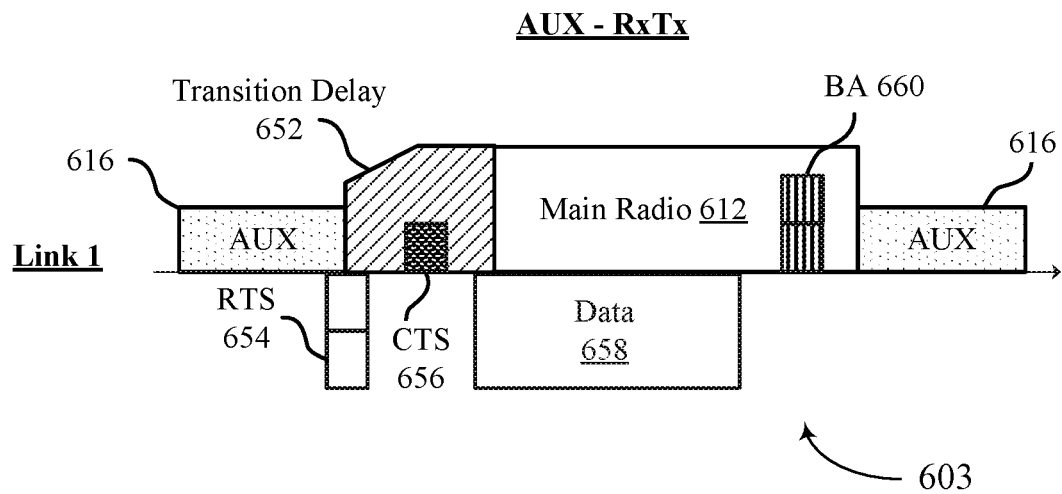
FIG. 6B illustrates an example of a timing diagram that illustrates communications over a single wireless link at a wireless device that includes a main radio and an auxiliary radio capable of receiving and transmitting.

FIG. 6A illustrates an example of a timing diagram 601 that illustrates communications over a single wireless link at a wireless device, such as the first wireless device 504 as described with reference to FIG. 5 that includes a main radio and an auxiliary radio 514 that is capable of Rx-only (operating in an Aux-Rx mode). FIG. 6B illustrates an example of a timing diagram 603 that illustrates communications over a single wireless link, such as the wireless link 506 of FIG. 5, at a wireless device, such as the first wireless device 504 as described with reference to FIG. 5, that includes a main radio 512 and an auxiliary radio 514 capable of receiving and transmitting (operating in an Aux-Tx/Rx mode). Aspects of the timing diagrams 601 and 603 may implement, or be implemented by, aspects of the WLAN 100 and the wireless communications system 500. The timing diagrams 601 and 603 illustrate timings for transitions from the auxiliary radio mode of the auxiliary radio 514 to the main radio mode of the main radio 512 on a single communication link in the wireless communications system 500. For example, the timing diagram 601 illustrates a timing for a transition from an AUX-Rx mode of the auxiliary radio 514 to the main radio mode of the main radio 512. The timing diagram 603 illustrates a timing for a transition from an Aux-Tx/Rx mode of the auxiliary radio 514 to the main radio mode of the main radio 512.

In the timing diagram 601 of FIG. 6A, when the auxiliary radio 514 of the first wireless device 504 operates in the AUX-Rx mode 614 on a single wireless link (shown in FIG. 6A as "Link 1"), such as the wireless link 506 of FIG. 5, the auxiliary radio 514 may receive an RTS 604 or soliciting PPDU that triggers transition from the AUX-Rx mode 614 to the main radio mode 612 for the single wireless link. In some examples, a transition delay 602 (such as a time for the main radio 512 to transition from an inactive mode to the main radio mode 612 after reception of the RTS/soliciting PPDU) may be within SIFS after the soliciting PPDU. After the transition delay 602, the main radio 512 may transmit a CTS 606 indicating that it is ready to receive the data packet 608. After receiving the data packet 608, the main radio 512 may transmit a BA 610. In some examples, thereafter, the wireless device 504 may transition from the main radio mode 612 to the AUX-Rx mode 614 (such as to save power). Transitioning, as used herein, refers to switching from using one radio for communications on a wireless link to a different radio for the communications on the wireless link. For example, in the timing diagram 601, the wireless device 504 may transition from operation in an AUX-Rx mode 614 using the auxiliary radio 514 on the wireless link 506 to operation in a main radio mode 612 using the main radio 512 on the wireless link 506.

In the timing diagram 603 of FIG. 6B, when the auxiliary radio 514 operates in the AUX-Tx/Rx mode 616 on a single wireless link (shown in FIG. 6B as "Link 1"), such as the wireless link 506 of FIG. 5, the auxiliary radio 514 may receive a RTS 654 or soliciting PPDU that triggers transition from the AUX-Tx/Rx mode 616 to the main radio mode 612 on the single wireless link. In some examples, a transition delay 652 (such as a time for the main radio 512 to transition from inactive to main radio mode after reception of soliciting PPDU) may be within 2*SIFS+CTRL_RSP+L_PHY_DUR after reception of the RTS/soliciting PPDU. The auxiliary radio 514 may transmit a CTS 656 indicating that the wireless device 504 is ready to receive the data packet 658. After receiving the data packet 658, the main radio 512 may transmit a BA 660. In some examples, thereafter, the wireless device 504 may transition from the main radio mode 612 to the AUX-Tx/Rx mode 616 (such as to save power).

In some examples, additional transition time may be added to the expected transition delays 602 and 652. The additional transition time may be provided using MPDU padding (such as the inclusion of padding bits 432 as described with reference to FIG. 4). In some examples, control frames, such as trigger frames, null data packet (NDP) announcement frames, and multi-traffic identifier block acknowledgement request and multi-station BA frames may support MPDU padding. The MU-RTS Trigger frame may be used for transmit opportunity (TXOP) initiation and may solicit CTS frames in non-HT PPDU. In some examples, null data packet (NDP) Announcement frames may support MPDU padding by appending multiple STA information fields with reserved association identifier (AID) values and may initiate all defined sounding sequences. Multi-traffic identifier (TID) block acknowledgement request (BAR) and multi-STA BA frames may support MPDU padding by appending multiple per AID TID information fields with reserved AID values and may be used for acknowledging since Ack may not be padded. In some examples, management frames may be used to support MPDU padding by appending multiple elements with zero length and for sending management information to a STA in low speed (LS) mode.

In some examples, data frames may support MPDU padding by appending multiple zero-length A-MSDU subframes to an A-MSDU and may allow sending data to a STA in LS mode. Padding may occur before FCS, so the wireless device 504 may start to transition to the main radio mode prior to MPDU validation. This may be an issue for malicious wake of main radio or processing done by auxiliary radio if additional time is needed to perform FCS or a message integrity check (MIC) check prior to sending the response. This may be solved by creating an FCS/MIC container that is part of and is located at the beginning of the padding sequence (such as in management (MGMT) frames, an element containing FCS/MIC field, and in Data frames an A-MSDU subframe containing the FCS/MIC field).

In some examples, MPDU padding may be used when the auxiliary radio 514 is operating in AUX-Rx mode and a transition of the main radio 512 is solicited. Padding of the initial PPDU may be required if the transition delay is greater than SIFS and the PPDU solicits an immediate response since the immediate response will be generated by the main radio 512. This example may require the peer wireless device 502 to be capable of appending padding to MPDUs contained in the initial PPDU and the wireless device 504 may be an ultra-high reliability (UHR) device as non-UHR devices may not be aware of this requirement of the STA. An AP may not use the AUX-Rx mode if the BSS serves non-UHR STAs as well, while a non-AP STA may use the AUX-Rx mode if the associated UHR AP supports it.

In some examples, MPDU padding may be used when the auxiliary radio 514 is operating in Aux-Tx/Rx mode and a transition of the main radio 512 is solicited. Padding of the initial or response PPDU may be required if the transition delay is greater than 2*SIFS+CTRL_RSP+L_PHY_DUR and the initial PPDU indicates that the transition of the main radio 512 is solicited. Padding may not be required for all frame exchanges that occur exclusively with the auxiliary radio. This example may require the peer wireless device 502 to be capable of appending padding to the MPDUs. The peer wireless device 502 may append padding if the auxiliary radio needs extra time prior to generate response PPDU and the wireless device 504 may be a UHR device as non-UHR devices may not be aware of this requirement of the auxiliary radio; otherwise, the auxiliary radio may include padding in response PPDUs. In some examples, the multi-STA BA frame response PPDU may contain MPDU padding, so the peer wireless device 502 may be an UHR device. The auxiliary radio 514 may indicate in the response PPDU whether the main radio 512 has successfully transitioned or not, so the peer wireless device 502 may continue using auxiliary radio parameters if the main radio 512 did not successfully transition during that transmission opportunity (such as main radio 512 is busy on another link or in coexistence mode).

Figure 7A:
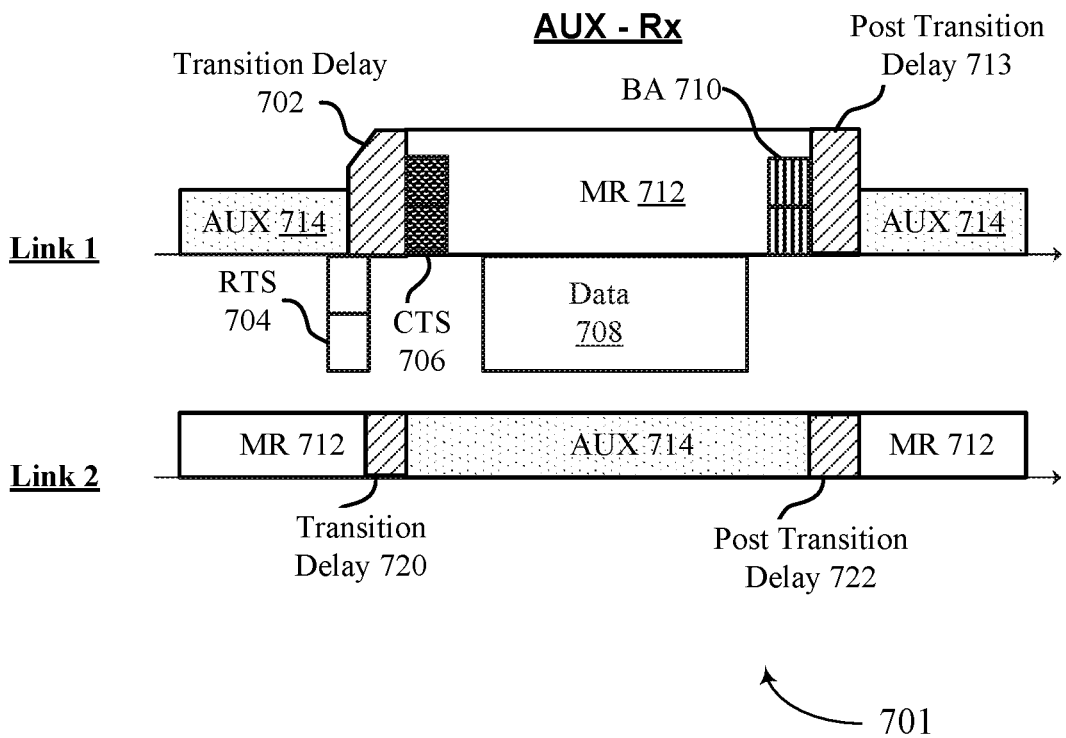
FIG. 7A illustrates an example of a timing diagram that illustrates communications over multiple wireless links at a wireless device that includes a main radio and a receive-only capable auxiliary radio.
Figure 7B:
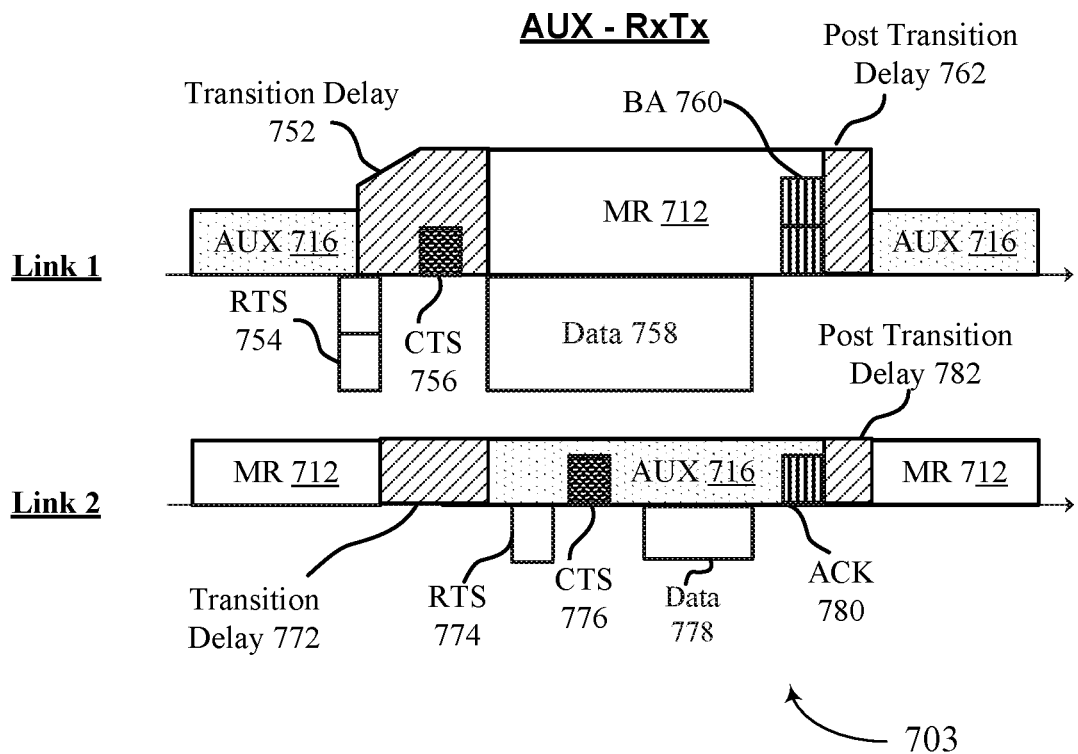
FIG. 7B illustrates an example of a timing diagram that illustrates communications over multiple wireless links at a wireless device that includes a main radio and an auxiliary radio capable of receiving and transmitting.

FIG. 7A illustrates an example of a timing diagram 701 that illustrates communications over multiple wireless links at a wireless device, such as the first wireless device 504 as described with reference to FIG. 5 that includes a main radio 512 and an auxiliary radio 514 that is capable of Rx-only (operating in an Aux-Rx mode). FIG. 7B illustrates an example of a timing diagram 703 that illustrates communications over multiple wireless links at a wireless device, such as the first wireless device 504 as described with reference to FIG. 5, that includes a main radio 512 and an auxiliary radio 514 capable of receiving and transmitting (operating in an Aux-Tx/Rx mode). Aspects of the timing diagrams 701 and 703 may implement, or be implemented by, aspects of the WLAN 100 and the wireless communications system 500. The timing diagrams 701 and 703 illustrate timings for transitions from the auxiliary radio mode of the auxiliary radio 514 to the main radio mode of the main radio 512 in a multi-link scenario. For example, the timing diagram 701 illustrates a timing for a transitions between a AUX-Rx mode 714 and a main radio mode 712 for a first and second wireless link. As another example, the timing diagram 703 illustrates a timing for a transitions between a AUX-Tx/Rx mode 716 and a main radio mode 712 for a first and second wireless link.

In the timing diagram 701 of FIG. 7A, when the auxiliary radio 514 of the wireless device 504 operates in the AUX-Rx mode 714 on the first wireless link (shown in FIG. 7A as "Link 1") and the main radio 512 of the wireless device 504 operates in the main radio mode 712 on the second wireless link (shown in FIG. 7A as "Link 2"), the auxiliary radio 514 may receive an RTS 704 or soliciting PPDU that triggers transition from the AUX-Rx mode 714 to the main radio mode 712 for the first wireless link. In some examples, a transition delay 702 (such as a time for the main radio 512 to transition from the second wireless link to the first wireless link after reception of the RTS/soliciting PPDU) may be within SIFS after the soliciting PPDU. After the transition delay 702, the main radio 512 may transmit a CTS 706 on the first wireless link indicating that it is ready to receive the data packet 708. After receiving the data packet 708, the main radio 512 may transmit a BA 710. In response to the RTS 704 or soliciting PPDU, the auxiliary radio 514 may transition from the first wireless link to the second wireless link. A transition delay 720 may correspond to the time for the auxiliary radio 514 to transition from the first wireless link to the second wireless link. On the second wireless link, the auxiliary radio may receive data transmissions or perform discovery procedures, as described herein. In some examples, after receiving the data packet 708, the main radio 512 may transition back to the second wireless link in accordance with a post transition delay 713 and the auxiliary radio 514 may transition back to the first wireless link in accordance with a post transition delay 722.

In the timing diagram 703 of FIG. 7B, when the auxiliary radio 514 operates in the Aux-Tx/Rx mode 716 on the first wireless link (shown in FIG. 7B as "Link 1") and the main radio 512 operates in the main radio mode 712 on the second wireless link (shown in FIG. 7B as "Link 2"), the auxiliary radio 514 may receive a RTS 754 or soliciting PPDU that triggers transition from the AUX-Rx mode 714 to the main radio mode 712 for the first wireless link. In some examples, a transition delay 752 (such as a time for the main radio 512 to transition from inactive to main radio mode after reception of soliciting PPDU) may be within 2*SIFS+

CTRL_RSP+L_PHY_DUR after reception of the RTS/soliciting PPDU. The auxiliary radio 514 may transmit a CTS 756 indicating that the wireless device 504 is ready to receive the data packet 758. After receiving the data packet 658, the main radio 512 may transmit a BA 760. In response to the RTS 754 or soliciting PPDU, the auxiliary radio 514 may transition from the first wireless link to the second wireless link. A transition delay 772 may correspond to the time for the auxiliary radio 514 to transition from the first wireless link to the second wireless link. On the second wireless link, the auxiliary radio may transmit or receive data packets 778 or perform discovery procedures, as described herein. For example, the auxiliary radio may receive an RTS 774, transmit in response a CTS 776, and receive a data packet 778 on the second wireless link. The auxiliary radio may transmit an Ack 780 in response to the data packet 778. In some examples, after receiving the data packet 758, the main radio 512 may transition back to the second wireless link in accordance with a post transition delay 762 and the auxiliary radio 514 may transition back to the first wireless link in accordance with a post transition delay 782.

In some examples, additional transition time may be added to the expected transition delays 702 and/or 752. The additional transition time may be provided using MPDU padding. For example, the transition delay 702 may be longer that a transition delay 602 as described with reference to FIG. 6A, for example because transition from one wireless link to another may take more time than transition from an inactive mode to an active mode on one wireless link. Accordingly, the wireless device 504 may advertise (such as broadcast in a control message 508) transition delays associated with transitions from inactive mode to active modes or from one wireless link to another wireless link, and/or which transition delay is applicable (such as whether the main radio is inactive or is active on another wireless link).

In some examples, the wireless device 504 may be a non-AP MLD that includes a main radio 512 and one auxiliary radio 514 capable of Rx-only, and the wireless device 502 may be an AP-MLD that includes one main radio per link. Such a scenario may be similar to EMLSR where the initiating PPDU is an MU RTS/BSRP trigger frame. The non-AP MLD (such as a STA) may transition the main radio 512 to the wireless link where the PPDU is received. The non-AP MLD may transfer the auxiliary radio 514 to the other wireless link (the second wireless link), as shown in the timing diagram 701, where the auxiliary radio 514 may receive non-HT PPDUs (if the auxiliary radio is kept on). Non-HT PPDUs that are not addressed to the non-AP MLD may be used for NAV setting or statistics gathering. Non-HT PPDUs that are addressed to the non-AP MLD may be part of an RX-only auxiliary channel (such as used for beacons, group frames, or parallel redundancies). If a non-AP MLD includes multiple (such as M) main radios and/or multiple (such as N) auxiliary radios, the transitions over multiple links may be implemented on the M main radios and N auxiliary radios, provided that the AP has at least N+M main radios, essentially enabling up to M Tx/Rx channels and up to N Rx channels. In some cases, less than all of the N or M radios may be used, because the non-AP MLD may determine to use a subset of the N or M radios to reduce power consumption.

In some examples, the wireless device 504 may be a non-AP MLD that includes a main radio 512 and one auxiliary radio 514 capable of Tx/Rx, and the wireless device 502 may be an AP-MLD that includes one main radio per link. Such a scenario may be similar to EMLSR where the initiating PPDU is an MU RTS/BSRP trigger frame. The non-AP MLD (such as a STA) may transition the main radio 512 to the wireless link where the PPDU is received. The non-AP MLD may transfer the auxiliary radio 514 to the other wireless link (the second wireless link), as shown in the timing diagram 703 of FIG. 7B, where the auxiliary radio 514 may receive non-HT PPDUs (if the auxiliary radio is kept on). Non-HT PPDUs that are not addressed to the non-AP MLD may be used for NAV setting or statistics gathering. Non-HT PPDUs that are addressed to the non-AP MLD may be part of an RX auxiliary channel (such as with a lower data rate than the main radio). Non-HT PPDUs that are generated by the non-AP MLD may provide real-time feedback to the AP-MLD for the ongoing main radio transmissions on the first wireless link. If a non-AP MLD includes multiple (such as M) main radios and/or multiple (such as N) auxiliary radios, the transitions over multiple links may be implemented on the M main radios and N auxiliary radios, provided that the AP has at least N+M main radios, essentially enabling up to M main radio Tx/Rx channels and up to N Tx/Rx auxiliary channels. In some cases, less than all of the N or M radios may be used, because the non-AP MLD may determine to use a subset of the N or M radios to reduce power consumption.

From the perspective of a non-AP-MLD, auxiliary Tx/Rx enablement at the non-AP MLD may provide benefits such as secondary auxiliary channels where lower data rates may be achieved with the peer MLD, which may help in fast feedback exchanges and may increase robustness for low latency/high reliability traffic. Auxiliary Tx/Rx enablement, however, requires a Tx component, which may increase costs of the non-AP MLD. An Rx-only auxiliary radio may provide Rx-only auxiliary channels which may increase robustness and improve reliability.

In some examples, the wireless device 504 may be an AP MLD that includes a main radio 512 and one auxiliary radio 514 capable of Rx-only (such as shown in the timing diagram 701). The AP MLD may include non-UHR non-AP STAs (and some UHR STAs) associated to the AP MLD that operate in the main radio link. The AP MLD may include one or more UHR non-AP MLDs that may operate over both the first wireless link and the second wireless link (or may switch between them). The main radio link may serve all main (downlink/uplink) traffic that is exchanged with the AP MLD. The auxiliary link may be used by the UHR non-AP MLDs only as a receive channel (from the perspective of the AP MLD). For example, a UHR non-AP MLD may send an initial PPDU in the auxiliary link when the main radio link is busy to indicate to the AP that the UHR non-AP MLD has uplink traffic pending. The AP MLD may track these requests (such as RTS frames) and then when the main radio link becomes idle, the AP MLD may trigger the UHR STAs for their uplink data. In some examples, the reception of the initial PPDU in the auxiliary link may not trigger the main radio of the AP MLD to switch to the auxiliary link since the main radio may become unavailable (unless the main radio is busy due to the reception of a PPDU that is addressed to the AP MLD, in which case the AP MLD may drop the main radio PPDU and transition to the auxiliary link). A STA that is residing in the main radio link may not be able to exchange frames with the AP MLD if the AP MLD transitions the main radio to an auxiliary link, but the AP MLD may then trigger the STA to which it dropped the PPDU after the main radio of the AP MLD switched back to the main radio link. Main radio switching may be allowed if all associated non-AP STAs are UHR MLDs that operate in the same number of links as the AP MLD (which may guarantee that all devices in the MLD BSS have a similar view of the occupancy of the service links (such as if the main radio of the AP MLD is busy, then the STAs may not initiate an exchange with the AP on any of the links). If an AP MLD includes multiple (such as M) main radios and/or multiple (such as N) auxiliary radios, the transitions over multiple links may be implemented on the M main radios and N auxiliary radios, essentially enabling up to M Tx/Rx channels for all types of STAs and up to N Rx channels available for a class of UHR non-AP MLDs. In some cases, less than all of the N or M radios may be used, because the AP MLD may determine to use a subset of the N or M radios to reduce power consumption.

In some examples, the wireless device 504 may be an AP MLD that includes a main radio 512 and one auxiliary radio 514 capable of Tx/Rx (such as shown in the example 703). The AP MLD may include non-UHR non-AP STAs (and some UHR STAs) associated to the AP MLD that operate in the main radio link, and the auxiliary radio link may be used for legacy 802.11a STAs. The AP MLD may include one or more UHR non-AP MLDs that may operate over both the first wireless link and the second wireless link (or may switch between them). The main radio link may serve all main (downlink/uplink) traffic that is exchanged with the AP MLD. The auxiliary radio link may be used by UHR non-AP MLDs as a low data rate Tx/Rx channel and as a link transition channel (from the perspective of the AP MLD). For example, a UHR non-AP MLD may send an initial PPDU in the auxiliary link, when the main radio link is busy, to indicate to the AP MLD that the UHR non-AP MLD has uplink traffic pending. The AP MLD may either switch the main radio to the auxiliary link or may respond that data may be exchanged in the auxiliary link in the auxiliary mode. The reception of the initial PPDU in the auxiliary link may trigger the main radio of the AP MLD to switch to the auxiliary link, during which time, the main radio link may become an auxiliary radio link. After the switch of the main radio link to an auxiliary radio link, an STA that is residing in the now auxiliary radio link will only be able to exchange frames with the AP MLD that are limited to non-HT PPDU or may need be delayed (until the auxiliary radio link switches back to a main radio link). Four modes may be signaled in the initial PPDU exchange: 1) switch main radio here; 2) auxiliary mode here (redux mode); 3) delayed main radio mode here (delayed full) while immediate auxiliary mode available; or 4) nothing. Bandwidth negotiation may indicate the transmission capability of the auxiliary radio. If an AP MLD includes multiple (such as M) main radios and/or multiple (such as N) auxiliary radios, the transitions over multiple links may be implemented on the M main radios and N auxiliary radios, essentially enabling up to M Tx/Rx channels for all types of STAs and up to N Tx/Rx channels available for a class of UHR non-AP MLDs. In some cases, less than all of the N or M radios may be used, because the AP MLD may determine to use a subset of the N or M radios to reduce power consumption.

From the perspective of an AP-MLD, auxiliary radios may provide benefits if the same number of links are available on both APs and STAs. When all STAs share the same link set as the AP, then the STAs may have a similar view of the main radio availability as the AP. A STA that does not share the same link set as the AP may not be aware of when the main radio of the AP has transitioned to a disjoint link. Hence, the uplink traffic may not be served for the STA even though the link is idle. Auxiliary Tx/RX enablement at the AP MLD may help resolve such issues since auxiliary Tx/Rx enables an AP MLD to initiate PPRDs in auxiliary links and therefore maintain connectivity with all STAs on all links. Auxiliary links may be used for lower data rates, helping in fast feedback exchanges and allowing for increased robustness for low latency/high reliability traffic.

Tx/Rx enablement at the non-AP MLD may provide benefits such as secondary auxiliary channels where lower data rates may be achieved with the peer MLD, which may help in fast feedback exchanges and may increase robustness for low latency/high reliability traffic. Aux Tx/Rx enablement, however, requires a Tx component, which may increase costs of the non-AP MLD. An Rx-only auxiliary radio may provide Rx-only auxiliary channels which may increase robustness and improve reliability. Aux Tx/Rx enablement, however, requires a Tx component, which may increase costs of the non-AP MLD. Auxiliary Rx-only at an AP MLD may reduce costs as compared to auxiliary Tx/Rx, however, the auxiliary Rx-only link may only be used for unreliable and lower data rate feedback, as moving the main radio to the auxiliary link may leave some links unavailable, possibly impacting legacy STA performance (which cannot be served unless the main radio is brought back to the auxiliary link on which the legacy STA is served).

Figure 8:
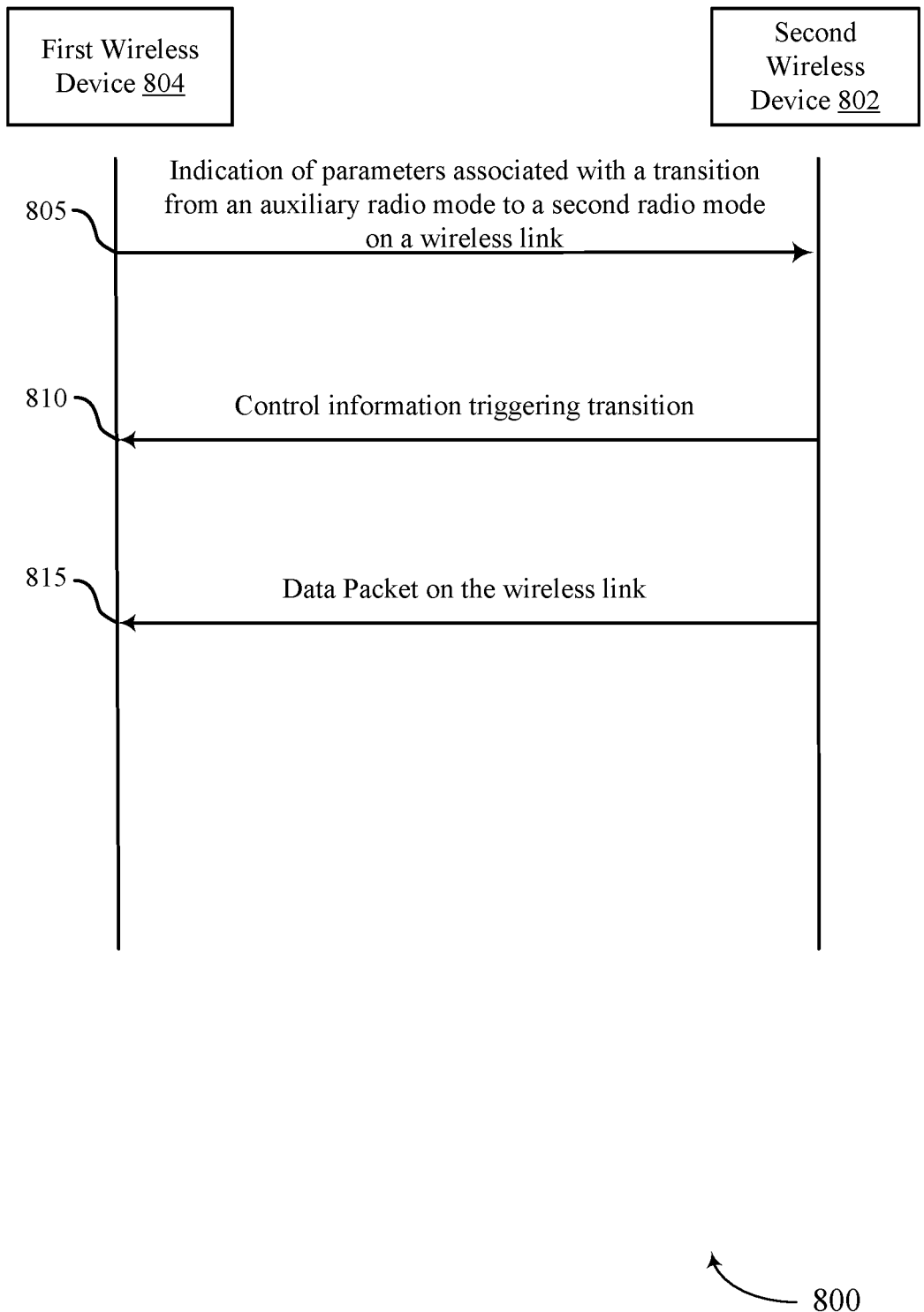
FIG. 8 illustrates an example of a process flow that supports communications between at least two wireless devices, one of the wireless devices including an auxiliary radio and a second radio (such as a main radio).

FIG. 8 illustrates an example of a process flow 800 that supports methods for improving wireless performance using auxiliary radios. The process flow includes a first wireless device 804, which may be an example of a first wireless device 504 as described herein. The process flow includes a second wireless device 802, which may be an example of a second wireless device 502 as described herein. In the following description of the process flow 800, the operations between the first wireless device 804 and the second wireless device 802 may be transmitted in a different order than the example order shown, or the operations performed by the first wireless device 804 and the second wireless device 802 may be performed in different orders or at different times. Some operations may also be omitted from the process flow 800, and other operations may be added to the process flow 800.

At 805, the first wireless device 804 may transmit an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio (such as an auxiliary radio) of the first wireless device 804 and the second radio mode associated with use of a second radio (such as a main radio) of the first wireless device different from the first radio.

At 810, the first wireless device 804 may receive, from the second wireless device 802 in communication with the first wireless device 804 via the first radio on the wireless link, control signaling that triggers the transition from the auxiliary radio mode on the wireless link to the second radio mode on the wireless link.

At 815, the first wireless device 804 may receive, from the second wireless device 802 via the second radio on the wireless link while the first wireless device is in the second radio mode in response to the control signaling, a data packet in accordance with the one or more parameters.

In some examples, receiving the signaling at 810 includes receiving the control signaling in a message format associated with the auxiliary radio mode, the one or more parameters including the message format.

In some examples, transmitting the indication of the one or more parameters includes transmitting an indication of a delay associated with the transition, and receipt of the data packet at 815 is at a time subsequent to reception of the control signaling by at least the delay.

In some examples, the first wireless device 804 may transmit an indication that the auxiliary radio mode is associated with the second radio being in a sleep mode, and the delay is associated with a transition of the second radio from the sleep mode.

In some examples, the first wireless device 804 may transmit an indication that the auxiliary radio mode is associated with the second radio operating on a second wireless link, and the delay is associated with a transition of the second radio from the second wireless link to the wireless link.

In some examples, the first wireless device 804 may receive, from the second wireless device 802 on the wireless link, padding during a time period subsequent to receipt of the control signaling that corresponds to the delay, the padding being contained in a same packet that contains the control signaling or in a subsequent packet.

In some examples, the first wireless device 804 may transmit, to the second wireless device 802 via the first radio, an acknowledgement message responsive to the control signaling, receipt of the data packet is responsive at least in part to the acknowledgement message, and the delay is associated with transmission of the acknowledgement message via the first radio.

In some examples, the first wireless device 804 may transmit, to the second wireless device 802 via the second radio, an acknowledgement message responsive to the control signaling, receipt of the data packet is responsive at least in part to the acknowledgement message, and the delay is associated with transmission of the acknowledgement message via the first radio.

In some examples, the first wireless device 804 may scan, via the first radio while communicating with the second wireless device 802 on the wireless link in the second radio mode, a set of multiple channels. In some examples, the first wireless device 804 may perform, via the first radio, an association procedure with a third wireless device via a channel of the plurality of channels responsive to the scan of the plurality of channels.

In some examples, the first wireless device 804 may identify, via the first radio while in communication with the second wireless device on the wireless link in the second radio mode, one or more channel metrics of the wireless link.

In some examples, the first wireless device 804 may transmit, to the second wireless device 802 via the first radio while in communication with the second wireless device 802 on the wireless link in the second radio mode, an indication of one or more channel metrics.

In some examples, the first wireless device 804 may receive one or more control messages from the second wireless device 802 via the first radio on a second wireless link in operation in the auxiliary radio mode while in communication with one or more data packets with the second wireless device 802 via the second radio on the wireless link in operation in the second radio mode.

In some examples, the first wireless device 804 may receive a set of data packets from the second wireless device 802 via the second radio on the wireless link while operating in the second radio mode; and receive a subset of the set of data packets from the second wireless device 802 via the first radio on a second wireless link while operating in the auxiliary radio mode.

In some examples, the first wireless device 804 may transmit one or more data packets to the second wireless device 802 via the first radio on a second wireless link while operating in the auxiliary radio mode while communicating one or more second data packets with the second wireless device 802 via the second radio on the wireless link while operating in the second radio mode.

In some examples, the first wireless device 804 may transition, in response to the control signaling, from operation in the second radio mode on a second wireless link to operation in the auxiliary radio mode on the second wireless link, and may transition, in response to the control signaling, from operation in the auxiliary radio mode on the wireless link to operation in the second radio mode on the wireless link.

In some examples, the first wireless device 804 may receive, from the second wireless device 802 while operating in the second radio mode on the wireless link, second control signaling that triggers a second transition from the second radio mode on the wireless link to the auxiliary radio mode on the wireless link. The first wireless device 804 may transition, in response to the second control signaling, from operation in the second radio mode on the wireless link to operation in the auxiliary radio mode on the wireless link. In some examples, the first wireless device 804 may transition, in response to the second control signaling, from operation in the auxiliary radio mode on a second wireless link to operation in the second radio mode on the second wireless link.

In some examples, the first wireless device 804 may transition (such as automatically), subsequent to reception of the data packet, from operation in the second radio mode on the wireless link to operation in the auxiliary radio mode on the wireless link. In some examples, the first wireless device 804 may transition (such as automatically), subsequent to reception of the data packet, from operation in the auxiliary radio mode on a second wireless link to operation in the second radio mode on the second wireless link.

In some examples, the first wireless device 804 may receive an indication identifying that the second wireless device 802 is operating in the second radio mode (such as a main radio mode) on the wireless link (such as based on monitoring the wireless link in the auxiliary radio mode). The first wireless device 804 may transition, in response to the identification that the second wireless device 802 is operating in the second radio mode on the wireless link, from operation in the auxiliary radio mode on the wireless link to operation in the second radio mode on the wireless link. In some examples, the first wireless device 804 transition, in response to the identification that the second wireless device 802 is operating in the second radio mode on the wireless link, from operation in the second radio mode on a second wireless link to operation in the auxiliary radio mode on the second wireless link.

In some examples, the first wireless device 804 may communicate (such as transmit and/or receive) data packets with the second wireless device 802 in accordance with a message format for the auxiliary mode on the wireless link while the while the first wireless device 804 is in the auxiliary radio mode.

Figure 9:
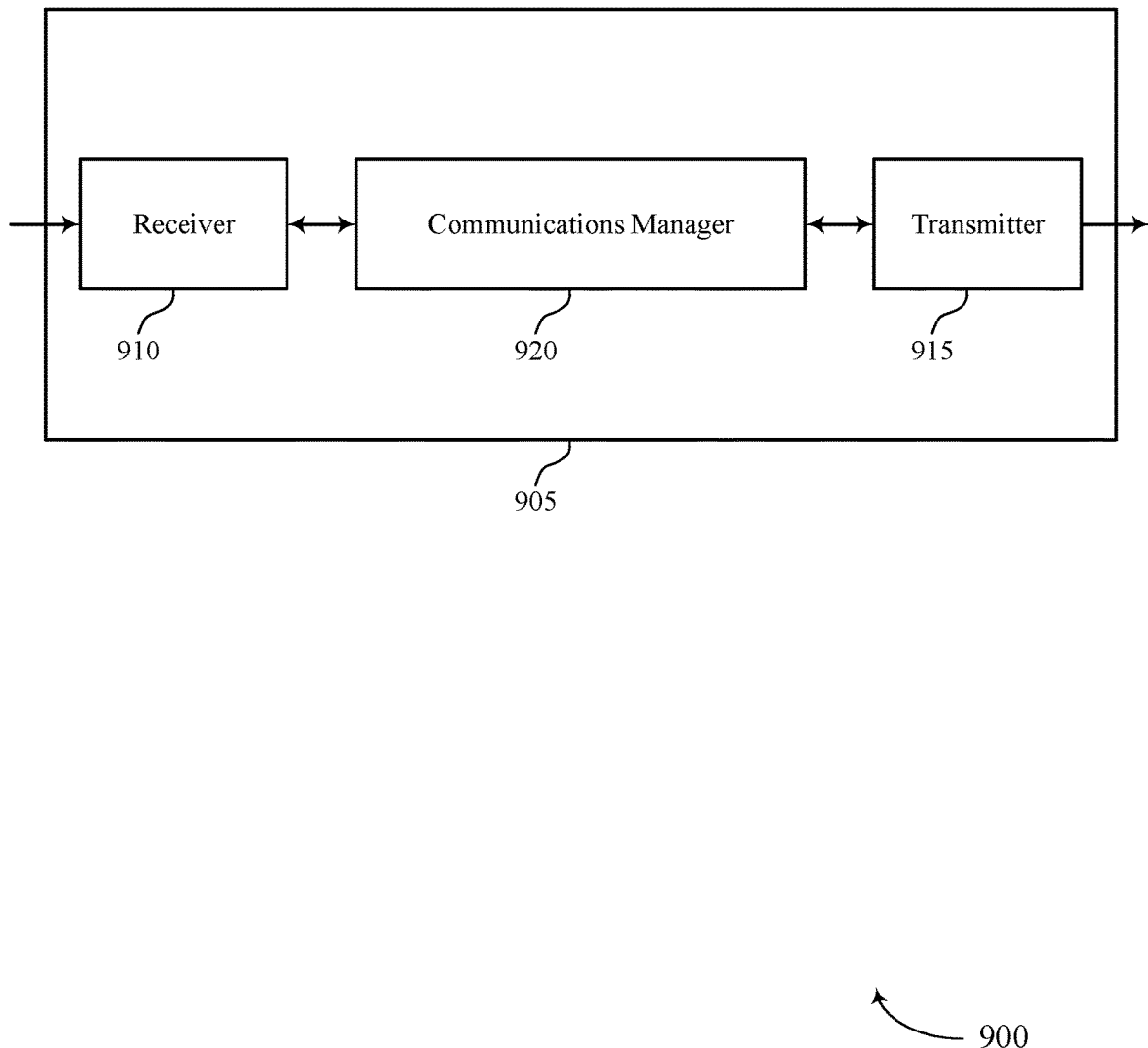
FIGS. 9 and 10 illustrate block diagrams of devices that include an auxiliary radio and a second radio (such as a main radio) and support methods for improving wireless performance using the auxiliary radio.

FIG. 9 illustrates a block diagram 900 of a device 905 that includes an auxiliary radio and a second radio (such as a main radio) and supports methods for improving wireless performance using auxiliary radios. The device 905 may be an example of aspects of an STA 104 or an AP 102 as described herein. For example, the device 905 may be an example of aspects of the first wireless device 504 of FIG.

5 or the first wireless device 804 of FIG. 8. The device 905 may include a receiver 910, a transmitter 915, and a communications manager 920. The device 905 may also include a processor. Each of these components may be in communication with one another (such as via one or more buses).

The receiver 910 may provide a means for receiving information such as packets, user data, control signaling, or any combination thereof associated with various information channels (such as control channels, data channels, information channels related to methods for improving wireless performance using auxiliary radios). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control signaling, or any combination thereof associated with various information channels (such as control channels, data channels, information channels related to methods for improving wireless performance using auxiliary radios). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of methods for improving wireless performance using auxiliary radios as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (such as in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (such as by executing, by the processor, instructions stored in the memory).

Additionally, or alternatively, in some examples, the communications manager 920, the receiver 910, the transmitter 915, or various combinations or components thereof may be implemented in code (such as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (such as configured as or otherwise supporting a means for performing the functions described in the present disclosure).

In some examples, the communications manager 920 may be configured to perform various operations (such as receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first wireless device in accordance with examples as disclosed herein. For example, the communications manager 920 may be configured as or otherwise support a means for transmitting, at the first wireless device, an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The communications manager 920 may be configured as or otherwise support a means for receiving, from a second wireless device in communication with the first wireless device via the first radio on the wireless link, control signaling that triggers the transition from the auxiliary radio mode on the wireless link to the second radio mode on the wireless link. The communications manager 920 may be configured as or otherwise support a means for receiving, from the second wireless device via the second radio on the wireless link while the first wireless device is in the second radio mode in response to the control signaling, a data packet in accordance with the one or more parameters.

By including or configuring the communications manager 920 in accordance with examples as described herein, the device 905 (such as a processor controlling or otherwise coupled with the receiver 910, the transmitter 915, the communications manager 920, or a combination thereof) may support techniques for reduced power consumption and more efficient utilization of communication resources.

Figure 10:
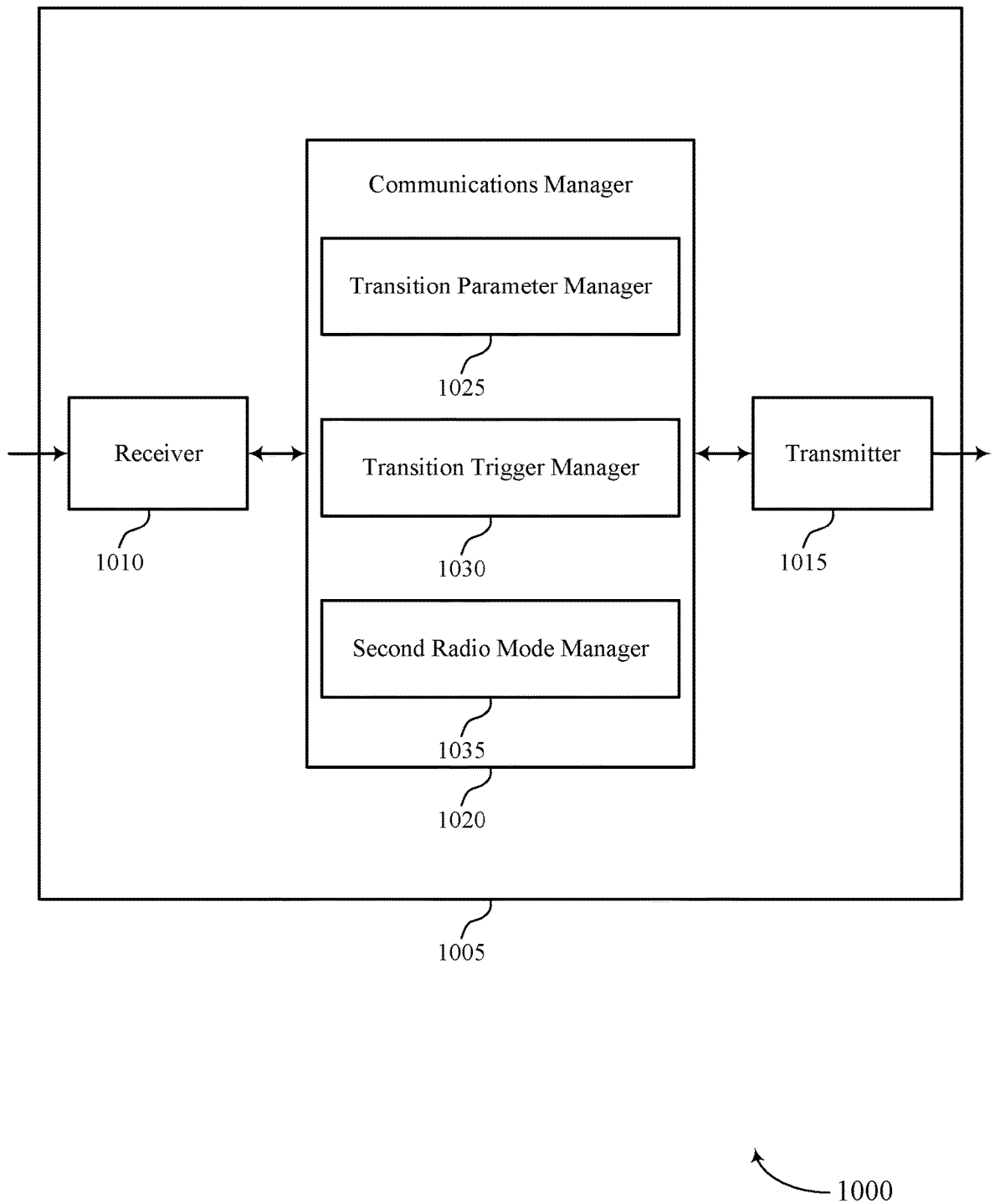

FIG. 10 illustrates a block diagram 1000 of a device 1005 that includes an auxiliary radio and a second radio (such as a main radio) and supports methods for improving wireless performance using auxiliary radios. The device 1005 may be an example of aspects of a device 905, an STA 104, or an AP 102 as described herein. The device 1005 may include a receiver 1010, a transmitter 1015, and a communications manager 1020. The device 1005 may also include a processor. Each of these components may be in communication with one another (such as via one or more buses).

The receiver 1010 may provide a means for receiving information such as packets, user data, control signaling, or any combination thereof associated with various information channels (such as control channels, data channels, information channels related to methods for improving wireless performance using auxiliary radios). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control signaling, or any combination thereof associated with various information channels (such as control channels, data channels, information channels related to methods for improving wireless performance using auxiliary radios). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of methods for improving wireless performance using auxiliary radios as described herein. For example, the communications manager 1020 may include a transition parameter manager 1025, a transition trigger manager 1030, a second radio mode manager 1035, or any combination thereof. The communications manager 1020 may be an example of aspects of a communications manager 920 as described herein. In some examples, the communications manager 1020, or various components thereof, may be configured to perform various operations (such as receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first wireless device in accordance with examples as disclosed herein. The transition parameter manager 1025 may be configured as or otherwise support a means for transmitting, at the first wireless device, an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The transition trigger manager 1030 may be configured as or otherwise support a means for receiving, from a second wireless device in communication with the first wireless device via the first radio on the wireless link, control signaling that triggers the transition from the auxiliary radio mode on the wireless link to the second radio mode on the wireless link. The second radio mode manager 1035 may be configured as or otherwise support a means for receiving, from the second wireless device via the second radio on the wireless link while the first wireless device is in the second radio mode in response to the control signaling, a data packet in accordance with the one or more parameters.

Figure 11:
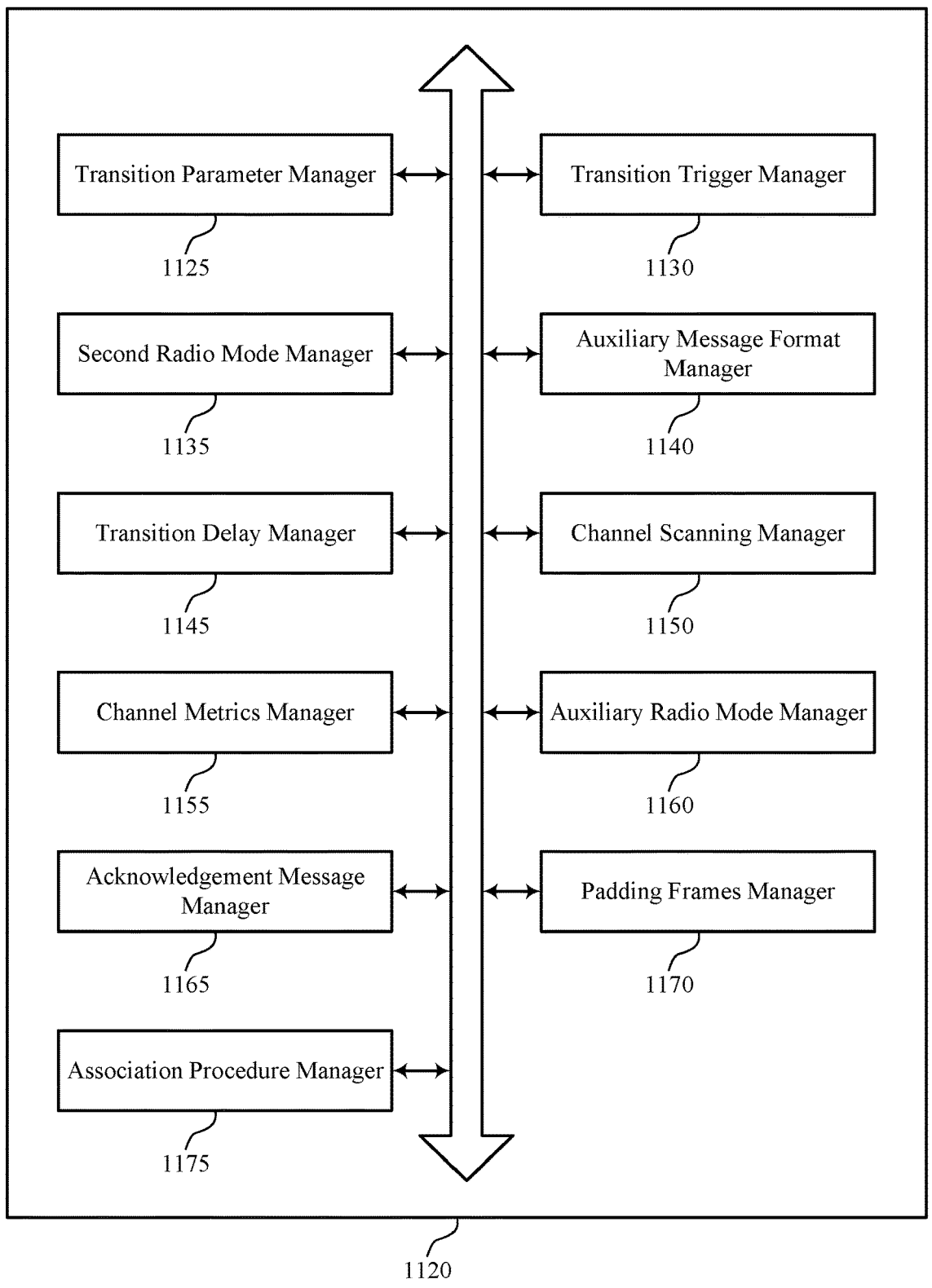
FIG. 11 illustrates a block diagram of a communications manager that supports methods for improving wireless performance at a device that includes an auxiliary radio and a second radio (such as a main radio).

FIG. 11 illustrates a block diagram 1100 of a communications manager 1120 that supports methods for improving wireless performance at a device that includes an auxiliary radio and a second radio (such as a main radio). The communications manager 1120 may be an example of aspects of a communications manager 920, a communications manager 1020, or both, as described herein. For example, the communications manager 1120 may be implemented or may implement aspects of the first wireless device 504 of FIG. 5 or the first wireless device 804 of FIG. 8. The communications manager 1120, or various components thereof, may be an example of means for performing various aspects of methods for improving wireless performance using auxiliary radios as described herein. For example, the communications manager 1120 may include a transition parameter manager 1125, a transition trigger manager 1130, a second radio mode manager 1135, an auxiliary message format manager 1140, a transition delay manager 1145, a channel scanning manager 1150, a channel metrics manager 1155, an auxiliary radio mode manager 1160, an acknowledgement message manager 1165, a padding frames manager 1170, an association procedure manager 1175, or any combination thereof. Each of these components may communicate, directly or indirectly, with one another (such as via one or more buses).

The communications manager 1120 may support wireless communications at a first wireless device in accordance with examples as disclosed herein. The transition parameter manager 1125 may be configured as or otherwise support a means for transmitting, at the first wireless device, an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The transition trigger manager 1130 may be configured as or otherwise support a means for receiving, from a second wireless device in communication with the first wireless device via the first radio on the wireless link, control signaling that triggers the transition from the auxiliary radio mode on the wireless link to the second radio mode on the wireless link. The second radio mode manager 1135 may be configured as or otherwise support a means for receiving, from the second wireless device via the second radio on the wireless link while the first wireless device is in the second radio mode in response to the control signaling, a data packet in accordance with the one or more parameters.

In some examples, to support receiving the control signaling, the auxiliary message format manager 1140 may be configured as or otherwise support a means for receiving the control signaling in a message format associated with the auxiliary radio mode, the one or more parameters including the message format.

In some examples, to support transmitting the indication of the one or more parameters, the transition delay manager 1145 may be configured as or otherwise support a means for transmitting an indication of a delay associated with the transition, receipt of the data packet being at a time subsequent to reception of the control signaling by at least the delay.

In some examples, the transition delay manager 1145 may be configured as or otherwise support a means for transmitting an indication that the auxiliary radio mode is associated with the second radio being in a sleep mode, the delay being associated with a transition of the second radio from the sleep mode.

In some examples, the transition delay manager 1145 may be configured as or otherwise support a means for transmitting an indication that the auxiliary radio mode is associated with the second radio operating on a second wireless link, the delay being associated with a transition of the second radio from the second wireless link to the wireless link.

In some examples, the padding frames manager 1170 may be configured as or otherwise support a means for receiving, from the second wireless device on the wireless link, padding during a time period subsequent to receipt of the control signaling that corresponds to the delay, the padding being contained in a same packet that contains the control signaling or in a subsequent packet.

In some examples, the acknowledgement message manager 1165 may be configured as or otherwise support a means for transmitting, to the second wireless device via the first radio, an acknowledgement message responsive to the control signaling, receipt of the data packet being responsive at least in part to the acknowledgement message, the delay being associated with transmission of the acknowledgement message via the first radio.

In some examples, the acknowledgement message manager 1165 may be configured as or otherwise support a means for transmitting, to the second wireless device via the first radio, an acknowledgement message responsive to the control signaling, receipt of the data packet being responsive at least in part to the acknowledgement message, the delay being associated with transmission of the acknowledgement message via the first radio.

In some examples, the acknowledgement message manager 1165 may be configured as or otherwise support a means for transmitting, to the second wireless device via the second radio, an acknowledgement message responsive to the control signaling, receipt of the data packet being responsive at least in part to the acknowledgement message, the delay being associated with transmission of the acknowledgement message via the second radio.

In some examples, the channel scanning manager 1150 may be configured as or otherwise support a means for scanning, via the first radio while communicating with the second wireless device on the wireless link in the second radio mode, a set of multiple channels.

In some examples, the association procedure manager 1175 may be configured as or otherwise support a means for performing, via the first radio, an association procedure with a third wireless device via a channel of the set of multiple channels responsive to the scan of the set of multiple channels.

In some examples, the channel metrics manager 1155 may be configured as or otherwise support a means for identifying, via the first radio while in communication with the second wireless device on the wireless link in the second radio mode, one or more channel metrics of the wireless link.

In some examples, the channel metrics manager 1155 may be configured as or otherwise support a means for transmitting, via the first radio while in communication with the second wireless device on the wireless link in the second radio mode, an indication of one or more channel metrics.

In some examples, the auxiliary radio mode manager 1160 may be configured as or otherwise support a means for receiving one or more control messages from the second wireless device via the first radio on a second wireless link while operating in the auxiliary radio mode while communicating one or more data packets with the second wireless device via the second radio on the wireless link while operating in the second radio mode.

In some examples, the second radio mode manager 1135 may be configured as or otherwise support a means for receiving a set of data packets from the second wireless device via the second radio on the wireless link while operating in the second radio mode. In some examples, the auxiliary radio mode manager 1160 may be configured as or otherwise support a means for receiving a subset of the set of data packets from the second wireless device via the first radio on a second wireless link while operating in the auxiliary radio mode.

In some examples, the auxiliary radio mode manager 1160 may be configured as or otherwise support a means for transmitting one or more data packets to the second wireless device via the first radio on a second wireless link while operating in the auxiliary radio mode while communicating one or more second data packets with the second wireless device via the second radio on the wireless link while operating in the second radio mode.

In some examples, the auxiliary radio mode manager 1160 may be configured as or otherwise support a means for transitioning, in response to the control signaling, from operation in the second radio mode on a second wireless link to operation in the auxiliary radio mode on the second wireless link. In some examples, the second radio mode manager 1135 may be configured as or otherwise support a means for transitioning, in response to the control signaling, from operation in the auxiliary radio mode on the wireless link to operation in the second radio mode on the wireless link.

In some examples, the transition trigger manager 1130 may be configured as or otherwise support a means for receiving, from the second wireless device while operating in the second radio mode on the wireless link, second control signaling that triggers a second transition from the second radio mode on the wireless link to the auxiliary radio mode on the wireless link. In some examples, the auxiliary radio mode manager 1160 may be configured as or otherwise support a means for transitioning, in response to the second control signaling, from operation in the second radio mode on the wireless link to operation in the auxiliary radio mode on the wireless link.

In some examples, the auxiliary radio mode manager 1160 may be configured as or otherwise support a means for transitioning, subsequent to reception of the data packet, from operation in the second radio mode on the wireless link to operation in the auxiliary radio mode on the wireless link.

In some examples, the transition trigger manager 1130 may be configured as or otherwise support a means for receiving an indication identifying that the second wireless device is operating in the second radio mode on the wireless link. In some examples, the second radio mode manager 1135 may be configured as or otherwise support a means for transitioning, in response to the identification, from operation in the auxiliary radio mode on the wireless link to operation in the second radio mode on the wireless link.

In some examples, the auxiliary radio mode manager 1160 may be configured as or otherwise support a means for communicating, on the wireless link while the first wireless device is in the auxiliary radio mode prior to reception of the control signaling, one or more data packets in a message format associated with the auxiliary radio mode.

Figure 12:
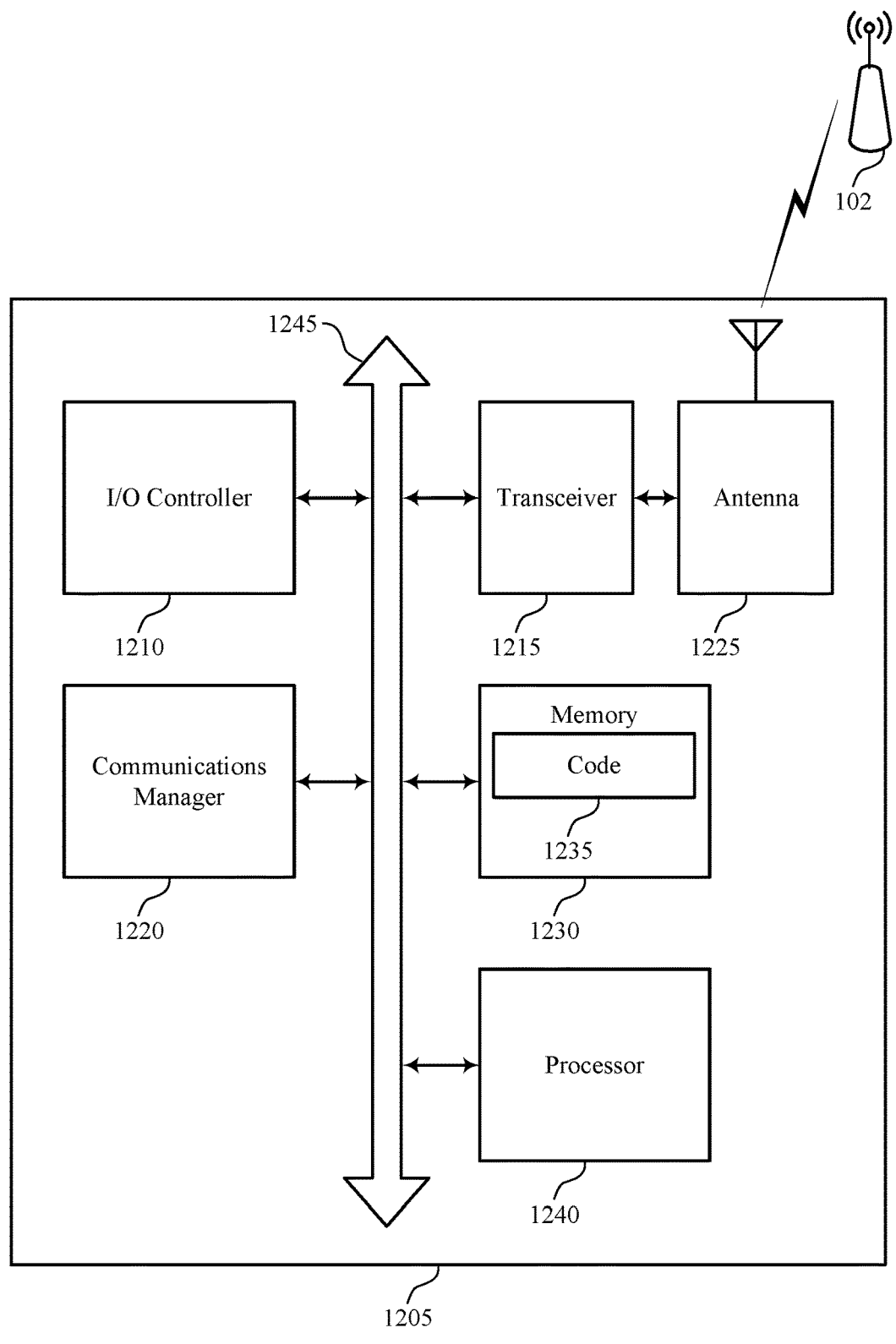
FIG. 12 illustrates a diagram of a system including a device that includes an auxiliary radio and a second radio (such as a main radio) and that supports methods for improving wireless performance using the auxiliary radio in accordance with one or more aspects of the present disclosure.

FIG. 12 illustrates a diagram of a system 1200 including a device 1205 that includes an auxiliary radio and a second radio (such as a main radio) and that supports methods for improving wireless performance using the auxiliary radio. The device 1205 may be an example of or include the components of a device 905, a device 1005, an STA 104, or an AP 102 as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (such as operatively, communicatively, functionally, electronically, electrically) via one or more buses (such as a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In some other cases, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (such as the memory 1230) to cause the device 1205 to perform various functions (such as functions or tasks supporting methods for improving wireless performance using auxiliary radios). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a first wireless device in accordance with examples as disclosed herein. For example, the communications manager 1220 may be configured as or otherwise support a means for transmitting, at the first wireless device, an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The communications manager 1220 may be configured as or otherwise support a means for receiving, from a second wireless device in communication with the first wireless device via the first radio on the wireless link, control signaling that triggers the transition from the auxiliary radio mode on the wireless link to the second radio mode on the wireless link. The communications manager 1220 may be configured as or otherwise support a means for receiving, from the second wireless device via the second radio on the wireless link while the first wireless device is in the second radio mode in response to the control signaling, a data packet in accordance with the one or more parameters.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, and longer battery life.

Figure 13:
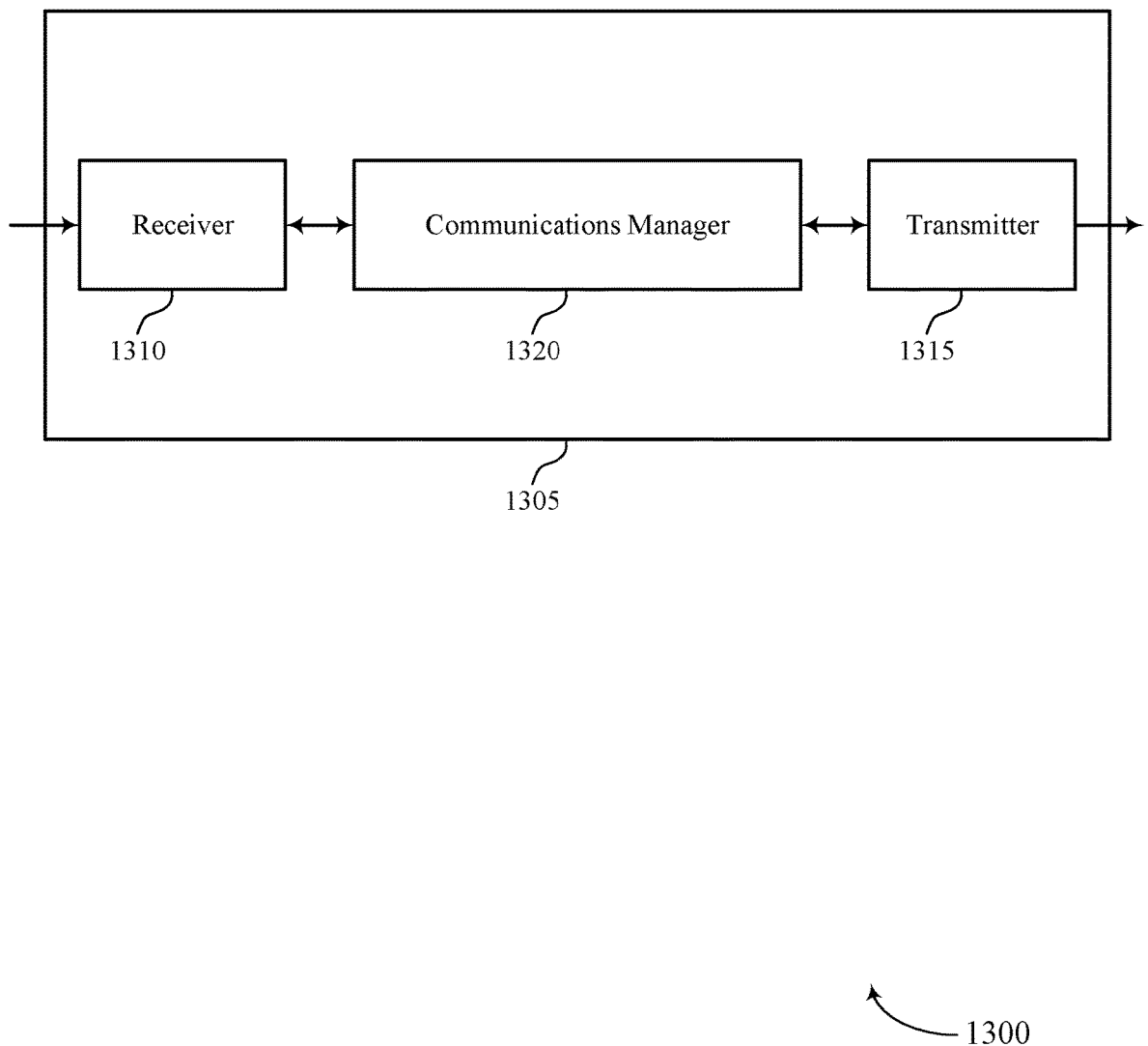
FIGS. 13 and 14 illustrate block diagrams of devices that support methods for improving wireless performance with devices that include an auxiliary radio and a second radio (such as a main radio).

FIG. 13 illustrates a block diagram 1300 of a device 1305 that supports methods for improving wireless performance with devices that include an auxiliary radio and a second radio (such as a main radio). The device 1305 may be an example of aspects of an AP 102 or an STA 104 as described herein. For example, the device 1305 may be an example of aspects of the second wireless device 502 of FIG. 5 or the second wireless device 802 of FIG. 8. The device 1305 may include a receiver 1310, a transmitter 1315, and a communications manager 1320. The device 1305 may also include a processor. Each of these components may be in communication with one another (such as via one or more buses).

The receiver 1310 may provide a means for receiving information such as packets, user data, control signaling, or any combination thereof associated with various information channels (such as control channels, data channels, information channels related to methods for improving wireless performance using auxiliary radios). Information may be passed on to other components of the device 1305. The receiver 1310 may utilize a single antenna or a set of multiple antennas.

The transmitter 1315 may provide a means for transmitting signals generated by other components of the device 1305. The transmitter 1315 may utilize a single antenna or a set of multiple antennas.

The communications manager 1320, the receiver 1310, the transmitter 1315, or various combinations thereof or various components thereof may be examples of means for performing various aspects of methods for improving wireless performance using auxiliary radios as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (such as in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (such as by executing, by the processor, instructions stored in the memory).

Additionally, or alternatively, in some examples, the communications manager 1320, the receiver 1310, the transmitter 1315, or various combinations or components thereof may be implemented in code (such as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (such as configured as or otherwise supporting a means for performing the functions described in the present disclosure).

In some examples, the communications manager 1320 may be configured to perform various operations (such as receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a second wireless device in accordance with examples as disclosed herein. For example, the communications manager 1320 may be configured as or otherwise support a means for receiving, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio. The communications manager 1320 may be configured as or otherwise support a means for transmitting, to the first wireless device in communication with the second wireless device on the wireless link, control signaling that triggers the transition from the auxiliary radio mode on the wireless link to the second radio mode on the wireless link. The communications manager 1320 may be configured as or otherwise support a means for transmitting, to the first wireless device via the second radio on the wireless link subsequent to transmission of the control signaling, a data packet in accordance with the one or more parameters.

By including or configuring the communications manager 1320 in accordance with examples as described herein, the device 1305 (such as a processor controlling or otherwise coupled with the receiver 1310, the transmitter 1315, the communications manager 1320, or a combination thereof) may support techniques for reduced power consumption and more efficient utilization of communication resources.

Figure 14:
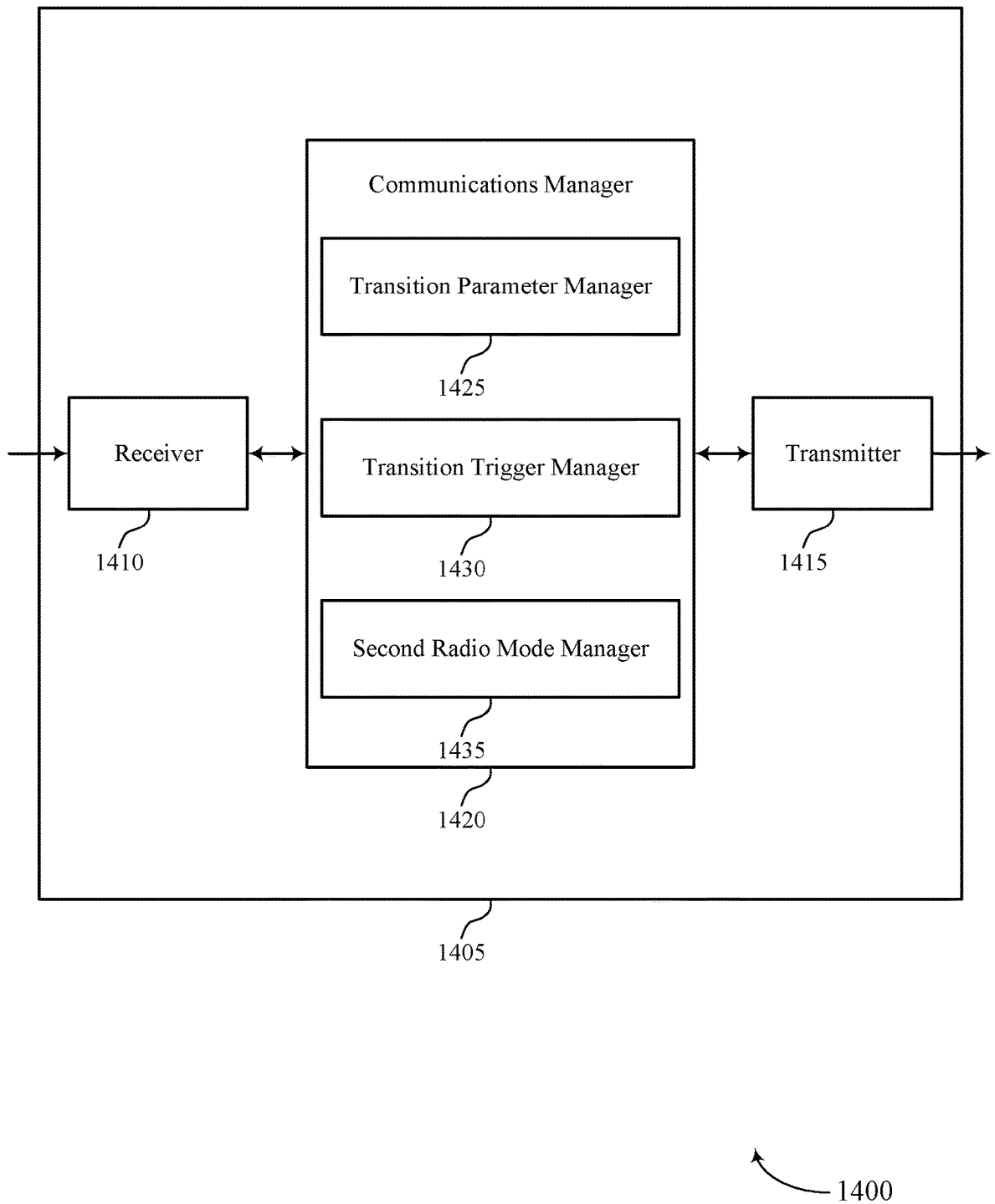

FIG. 14 illustrates a block diagram 1400 of a device 1405 that supports methods for improving wireless performance with devices that include an auxiliary radio and a second radio (such as a main radio). The device 1405 may be an example of aspects of a device 1305, an AP 102, or an STA 104 as described herein. The device 1405 may include a receiver 1410, a transmitter 1415, and a communications manager 1420. The device 1405 may also include a processor. Each of these components may be in communication with one another (such as via one or more buses).

The receiver 1410 may provide a means for receiving information such as packets, user data, control signaling, or any combination thereof associated with various information channels (such as control channels, data channels, information channels related to methods for improving wireless performance using auxiliary radios). Information may be passed on to other components of the device 1405. The receiver 1410 may utilize a single antenna or a set of multiple antennas.

The transmitter 1415 may provide a means for transmitting signals generated by other components of the device 1405. The transmitter 1415 may utilize a single antenna or a set of multiple antennas.

The device 1405, or various components thereof, may be an example of means for performing various aspects of methods for improving wireless performance using auxiliary radios as described herein. For example, the communications manager 1420 may include a transition parameter manager 1425, a transition trigger manager 1430, a second radio mode manager 1435, or any combination thereof. The communications manager 1420 may be an example of aspects of a communications manager 1320 as described herein. In some examples, the communications manager 1420, or various components thereof, may be configured to perform various operations (such as receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a second wireless device in accordance with examples as disclosed herein. The transition parameter manager 1425 may be configured as or otherwise support a means for receiving, from a first wireless device, an indication of one or more parameters associated with a transition, at the first wireless device, from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The transition trigger manager 1430 may be configured as or otherwise support a means for transmitting, to the first wireless device in communication with the second wireless device on the wireless link, control signaling that triggers the transition from the auxiliary radio mode on the wireless link to the second radio mode on the wireless link. The second radio mode manager 1435 may be configured as or otherwise support a means for transmitting, to the first wireless device via the second radio on the wireless link subsequent to transmission of the control signaling, a data packet in accordance with the one or more parameters.

Figure 15:
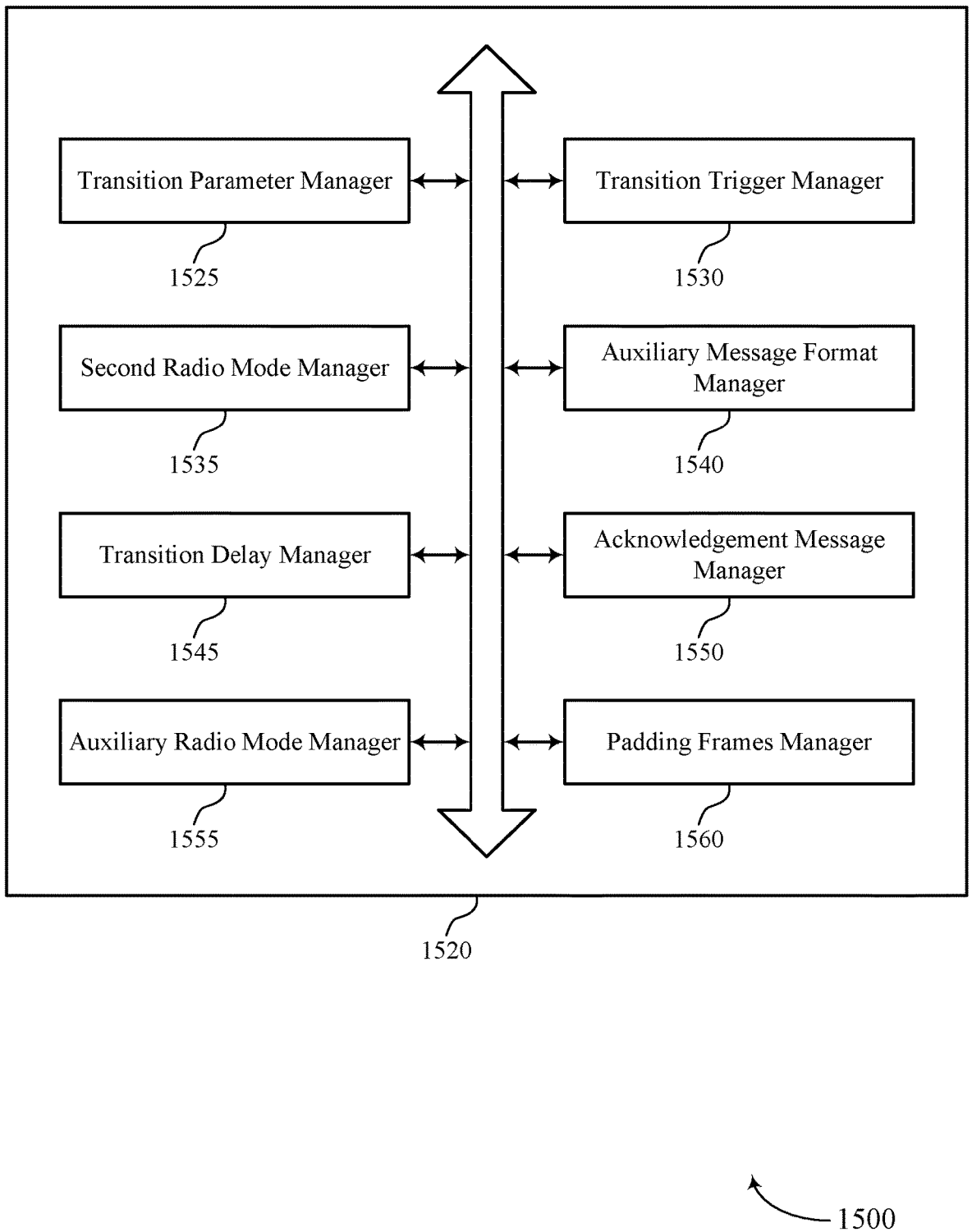
FIG. 15 illustrates a block diagram of a communications manager that supports methods for improving wireless performance with devices that include an auxiliary radio and a second radio (such as a main radio).

FIG. 15 illustrates a block diagram 1500 of a communications manager 1520 that supports methods for improving wireless performance with devices that include an auxiliary radio and a second radio (such as a main radio). The communications manager 1520 may be an example of aspects of a communications manager 1320, a communications manager 1420, or both, as described herein. For example, the communications manager 1520 may be implemented or may implement aspects of the second wireless device 502 of FIG. 5 or the second wireless device 802 of FIG. 8. The communications manager 1520, or various components thereof, may be an example of means for performing various aspects of methods for improving wireless performance using auxiliary radios as described herein. For example, the communications manager 1520 may include a transition parameter manager 1525, a transition trigger manager 1530, a second radio mode manager 1535, an auxiliary message format manager 1540, a transition delay manager 1545, an acknowledgement message manager 1550, an auxiliary radio mode manager 1555, a padding frames manager 1560, or any combination thereof. Each of these components may communicate, directly or indirectly, with one another (such as via one or more buses).

The communications manager 1520 may support wireless communications at a second wireless device in accordance with examples as disclosed herein. The transition parameter manager 1525 may be configured as or otherwise support a means for receiving, from a first wireless device, an indication of one or more parameters associated with a transition, at the first wireless device, from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The transition trigger manager 1530 may be configured as or otherwise support a means for transmitting, to the first wireless device in communication with the second wireless device on the wireless link, control signaling that triggers the transition from the auxiliary radio mode on the wireless link to the second radio mode on the wireless link. The second radio mode manager 1535 may be configured as or otherwise support a means for transmitting, to the first wireless device via the second radio on the wireless link subsequent to transmission of the control signaling, a data packet in accordance with the one or more parameters.

In some examples, to support transmitting the control signaling, the auxiliary message format manager 1540 may be configured as or otherwise support a means for transmitting the control signaling in a message format associated with the auxiliary radio mode, the one or more parameters including the message format.

In some examples, to support receiving the indication of the one or more parameters, the transition delay manager 1545 may be configured as or otherwise support a means for receiving an indication of a delay associated with the transition, transmission of the data packet being at a time subsequent to transmission of the control signaling by at least the delay.

In some examples, the transition delay manager 1545 may be configured as or otherwise support a means for receiving, from the first wireless device, an indication that the auxiliary radio mode is associated with the second radio being in a sleep mode, the delay being associated with a transition of the second radio from the sleep mode.

In some examples, the transition delay manager 1545 may be configured as or otherwise support a means for receiving, from the first wireless device, an indication that the auxiliary radio mode is associated with the second radio operating on a second wireless link, the delay being associated with a transition of the second radio from the second wireless link to the wireless link.

In some examples, the padding frames manager 1560 may be configured as or otherwise support a means for transmitting, to the first wireless device, one or more padding frames during a time period subsequent to transmission of the control signaling corresponding to the delay.

In some examples, the acknowledgement message manager 1550 may be configured as or otherwise support a means for receiving, from the first wireless device on a second wireless link while in communication with the first wireless device on the wireless link, an indication of one or more channel metrics of the wireless link.

In some examples, the auxiliary radio mode manager 1555 may be configured as or otherwise support a means for transmitting, to the first wireless device, one or more control messages on a second wireless link while communicating one or more data packets with the first wireless device on the wireless link.

In some examples, the second radio mode manager 1535 may be configured as or otherwise support a means for transmitting, to the first wireless device, a set of data packets on the wireless link. In some examples, the auxiliary radio mode manager 1555 may be configured as or otherwise support a means for transmitting, to the first wireless device, a subset of the set of data packets on a second wireless link.

In some examples, the auxiliary radio mode manager 1555 may be configured as or otherwise support a means for receiving one or more data packets from the first wireless device on a second wireless link while communicating one or more second data packets with the first wireless device on the wireless link.

Figure 16:
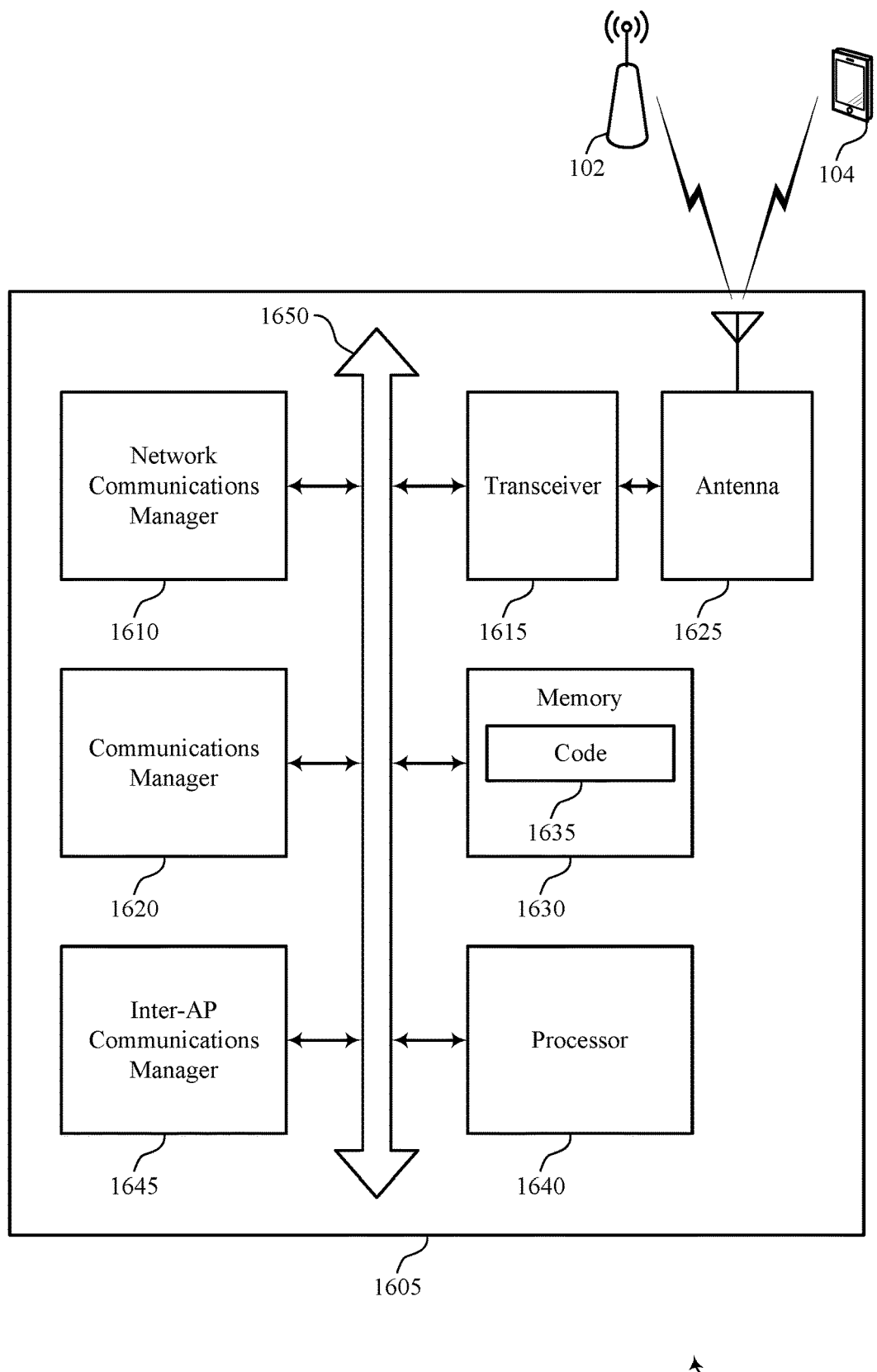
FIG. 16 illustrates a diagram of a system including a device that supports methods for improving wireless performance with devices that include an auxiliary radio and a second radio (such as a main radio).

FIG. 16 illustrates a diagram of a system 1600 including a device 1605 that supports methods for improving wireless performance with devices that include an auxiliary radio and a second radio (such as a main radio). The device 1605 may be an example of or include the components of a device 1305, a device 1405, an AP 102, or an STA 104 as described herein. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-AP communications manager 1645. These components may be in electronic communication or otherwise coupled (such as operatively, communicatively, functionally, electronically, electrically) via one or more buses (such as a bus 1650).

The network communications manager 1610 may manage communications with a core network (such as via one or more wired backhaul links). For example, the network communications manager 1610 may manage the transfer of data communications for client devices, such as one or more STAs 104.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets and provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. In some cases, the memory 1630 may contain, among other things, a BIOS which may control basic hardware or software operation such as the interaction with peripheral components or devices.

The processor 1640 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (such as the memory 1630) to cause the device 1605 to perform various functions (such as functions or tasks supporting methods for improving wireless performance using auxiliary radios). For example, the device 1605 or a component of the device 1605 may include a processor 1640 and memory 1630 coupled with or to the processor 1640, the processor 1640 and memory 1630 configured to perform various functions described herein.

The inter-station communications manager 1645 may manage communications with other APs 102, and may include a controller or scheduler for controlling communications with STAs 104 in cooperation with other APs 102. For example, the inter-station communications manager 1645 may coordinate scheduling for transmissions to APs 102 for various interference mitigation techniques such as beamforming or joint transmission. In some examples, the inter-station communications manager 1645 may provide an X2 interface within an LTE/LTE-A wireless communication network technology to provide communication between APs 102.

The communications manager 1620 may support wireless communications at a second wireless device in accordance with examples as disclosed herein. For example, the communications manager 1620 may be configured as or otherwise support a means for receiving, from a first wireless device, an indication of one or more parameters associated with a transition, at the first wireless device, from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The communications manager 1620 may be configured as or otherwise support a means for transmitting, to the first wireless device in communication with the second wireless device on the wireless link, control signaling that triggers the transition from the auxiliary radio mode on the wireless link to the second radio mode on the wireless link. The communications manager 1620 may be configured as or otherwise support a means for transmitting, to the first wireless device via the second radio on the wireless link subsequent to transmission of the control signaling, a data packet in accordance with the one or more parameters.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, and longer battery life.

Figure 17:
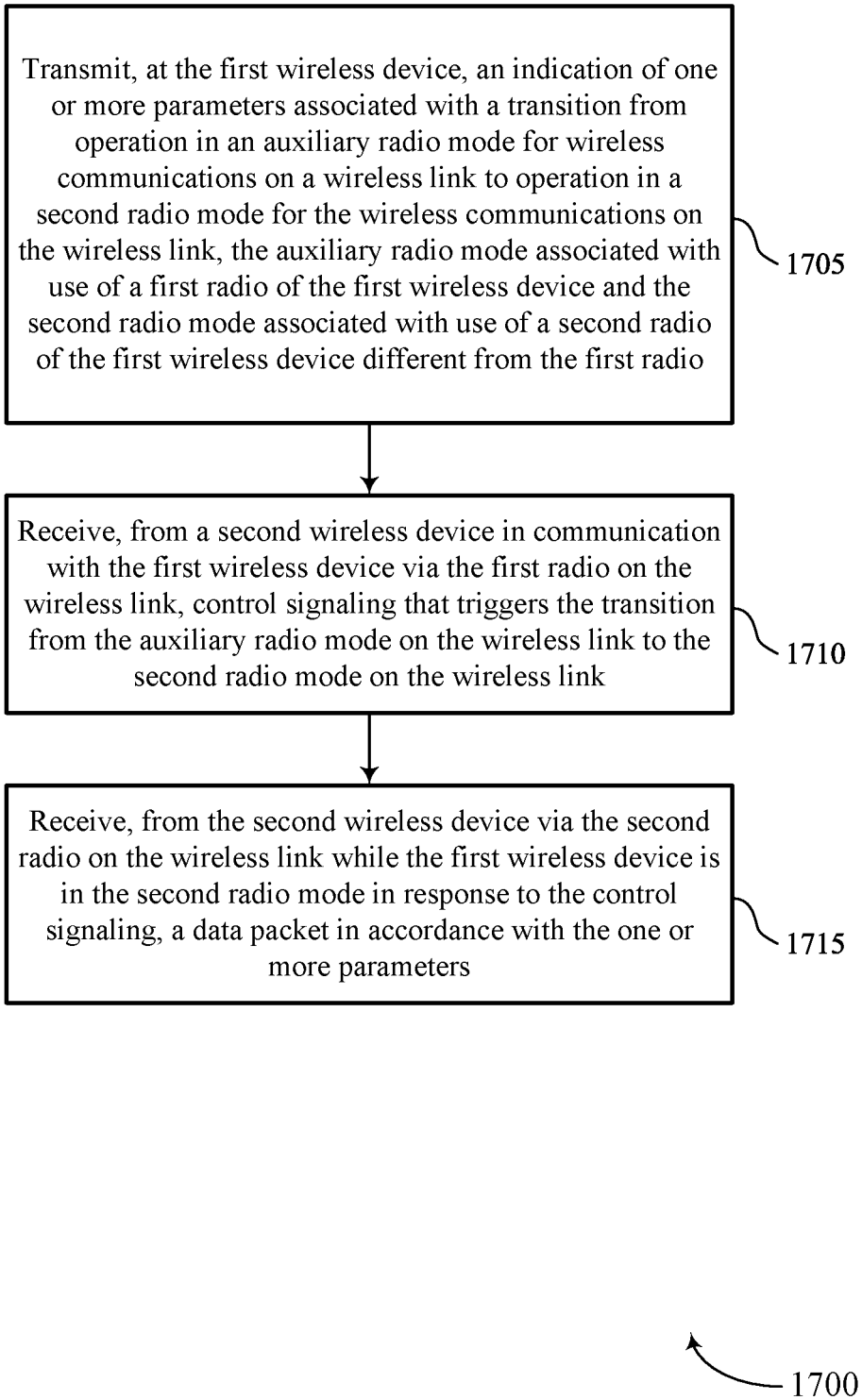
FIGS. 17 and 18 illustrate flowcharts showing methods that support methods for improving wireless performance using auxiliary radios.

FIG. 17 illustrates a flowchart illustrating a method 1700 that supports methods for improving wireless performance using auxiliary radios. The operations of the method 1700 may be implemented by an STA 104 or an AP 102 or its components as described herein. For example, the operations of the method 1700 may be performed by an STA 104 or an AP 102 as described with reference to FIGS. 1 through 12. In some examples, an STA 104 or an AP 102 may execute a set of instructions to control the functional elements of the STA to perform the described functions. Additionally, or alternatively, the STA or the AP 102 may perform aspects of the described functions using special-purpose hardware.

At 1705, the method may include transmitting, at the first wireless device, an indication of one or more parameters associated with a transition from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The operations of 1705 may be performed in accordance with examples as disclosed herein. In some examples, aspects of the operations of 1705 may be performed by a transition parameter manager 1125 as described with reference to FIG. 11. For example, the first wireless device be a first wireless device 504 of FIG. 5 or a first wireless device 804 of FIG. 8 as described herein, the second wireless device may be a second wireless device 502 of FIG. 5 or a second wireless device 802 of FIG. 8, and the wireless link may be a wireless link 506 as described herein.

At 1710, the method may include receiving, from a second wireless device in communication with the first wireless device via the first radio on the wireless link, control signaling that triggers the transition from the auxiliary radio mode on the wireless link to the second radio mode on the wireless link. The operations of 1710 may be performed in accordance with examples as disclosed herein. In some examples, aspects of the operations of 1710 may be performed by a transition trigger manager 1130 as described with reference to FIG. 11.

At 1715, the method may include receiving, from the second wireless device via the second radio on the wireless link while the first wireless device is in the second radio mode in response to the control signaling, a data packet in accordance with the one or more parameters. The operations of 1715 may be performed in accordance with examples as disclosed herein. In some examples, aspects of the operations of 1715 may be performed by a second radio mode manager 1135 as described with reference to FIG. 11.

Figure 18:
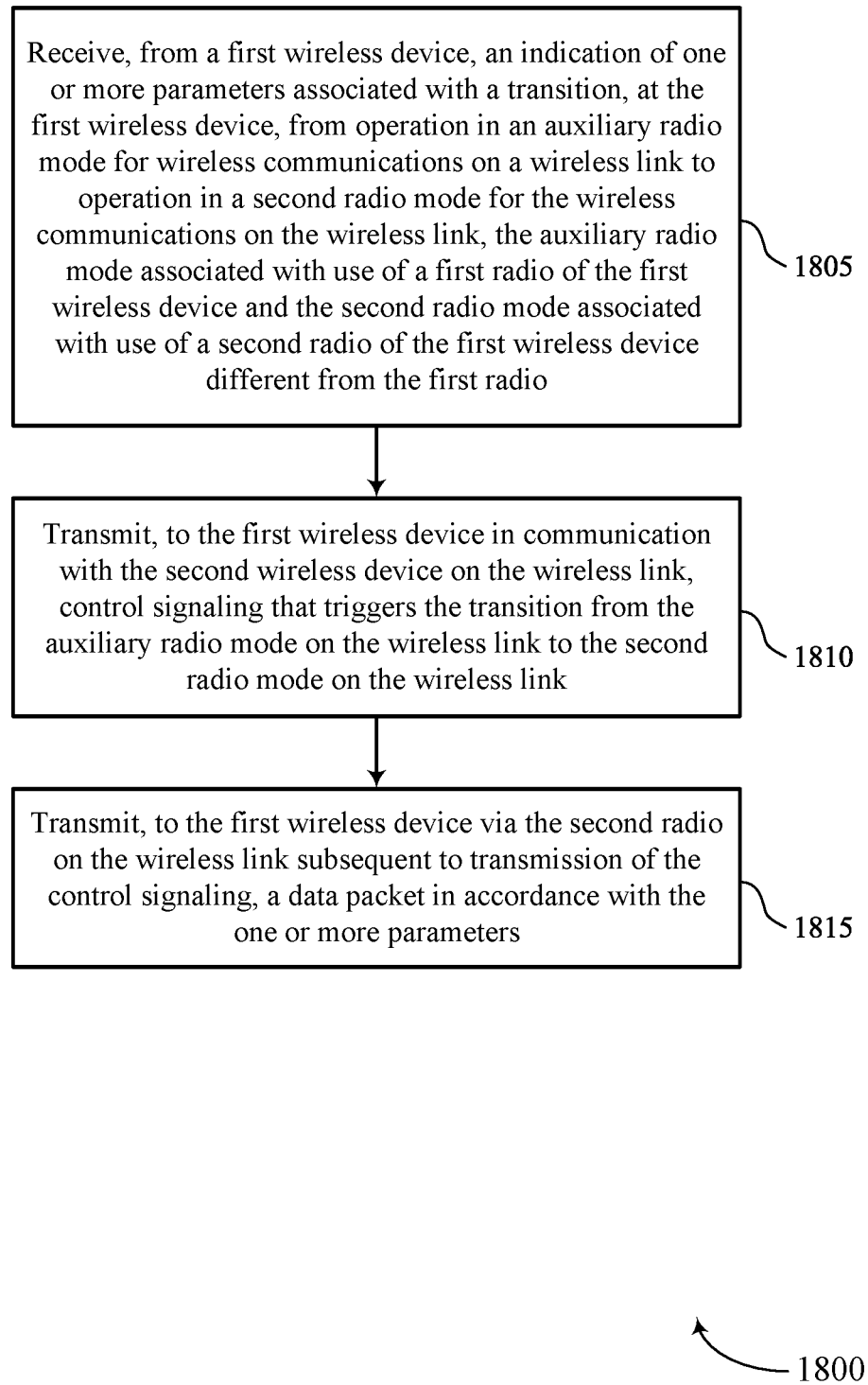

FIG. 18 illustrates a flowchart illustrating a method 1800 that supports methods for improving wireless performance using auxiliary radios. The operations of the method 1800 may be implemented by an AP or its components as described herein. For example, the operations of the method 1800 may be performed by an AP as described with reference to FIGS. 1 through 8 and 13 through 16. In some examples, an AP may execute a set of instructions to control the functional elements of the AP to perform the described functions. Additionally, or alternatively, the AP may perform aspects of the described functions using special-purpose hardware.

At 1805, the method may include receiving, from a first wireless device, an indication of one or more parameters associated with a transition, at the first wireless device, from operation in an auxiliary radio mode for wireless communications on a wireless link to operation in a second radio mode (such as a main radio mode) for the wireless communications on the wireless link, the auxiliary radio mode associated with use of a first radio of the first wireless device and the second radio mode associated with use of a second radio of the first wireless device different from the first radio. The operations of 1805 may be performed in accordance with examples as disclosed herein. In some examples, aspects of the operations of 1805 may be performed by a transition parameter manager 1525 as described with reference to FIG. 15. For example, the first wireless device be a first wireless device 504 of FIG. 5 or a first wireless device 804 of FIG. 8 as described herein, the second wireless device may be a second wireless device 502 of FIG. 5 or a second wireless device 802 of FIG. 8, and the wireless link may be a wireless link 506 as described herein.

At 1810, the method may include transmitting, to the first wireless device in communication with the second wireless device on the wireless link, control signaling that triggers the transition from the auxiliary radio mode on the wireless link to the second radio mode on the wireless link. The operations of 1810 may be performed in accordance with examples as disclosed herein. In some examples, aspects of the operations of 1810 may be performed by a transition trigger manager 1530 as described with reference to FIG. 15.

At 1815, the method may include transmitting, to the first wireless device via the second radio on the wireless link subsequent to transmission of the control signaling, a data packet in accordance with the one or more parameters. The operations of 1815 may be performed in accordance with examples as disclosed herein. In some examples, aspects of the operations of 1815 may be performed by a second radio mode manager 1535 as described with reference to FIG. 15.

The following provides an overview of aspects of the present disclosure:

Aspect 1: A method for wireless communications at a first wireless device, comprising: transmitting, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio; receiving, from a second wireless device in communication with the first wireless device via the first radio on the wireless link, control signaling that triggers the transition from the auxiliary radio mode on the wireless link to the second radio mode on the wireless link; and receiving, from the second wireless device via the second radio on the wireless link while the first wireless device is in the second radio mode in response to the control signaling, a data packet in accordance with the one or more parameters.

Aspect 2: The method of aspect 1, wherein receiving the control information comprises: receiving the control signaling in a message format associated with the auxiliary radio mode, the one or more parameters comprising the message format.

Aspect 3: The method of any of aspects 1 through 2, wherein transmitting the indication of the one or more parameters comprises: transmitting an indication of a delay associated with the transition, receipt of the data packet being at a time subsequent to reception of the control signaling by at least the delay.

Aspect 4: The method of aspect 3, further comprising: transmitting an indication that the auxiliary radio mode is associated with the second radio being in a sleep mode, the delay being associated with a transition of the second radio from the sleep mode.

Aspect 5: The method of aspect 3, further comprising: transmitting an indication that the auxiliary radio mode is associated with the second radio operating on a second wireless link, the delay being associated with a transition of the second radio from the second wireless link to the wireless link.

Aspect 6: The method of any of aspects 3 through 5, further comprising: receiving, from the second wireless device on the wireless link, padding during a time period subsequent to receipt of the control signaling that corresponds to the delay, the padding being contained in a same packet that contains the control signaling or in a subsequent packet.

Aspect 7: The method of any of aspects 3 through 6, further comprising: transmitting, to the second wireless device via the first radio, an acknowledgement message responsive to the control signaling, the delay being associated with transmission of the acknowledgement message via the first radio and having a duration of at least one short interframe space.

Aspect 8: The method of any of aspects 3 through 6, further comprising: transmitting, to the second wireless device via the second radio, an acknowledgement message responsive to the control signaling, the delay being associated with transmission of the acknowledgement message via the second radio and having a duration of at least a plurality of short interframe spaces, a transmission time of the acknowledgement message, and a preamble duration.

Aspect 9: The method of any of aspects 1 through 8, further comprising: scanning, via the first radio while communicate with the second wireless device on the wireless link in the second radio mode, a plurality of channels.

Aspect 10: The method of aspect 9, further comprising: performing, via the first radio, an association procedure with a third wireless device via a channel of the plurality of channels responsive to the scan of the plurality of channels.

Aspect 11: The method of any of aspects 1 through 10, further comprising: identifying, via the first radio while in communication with the second wireless device on the wireless link in the second radio mode, one or more channel metrics of the wireless link.

Aspect 12: The method of any of aspects 1 through 11, further comprising: transmitting, via the first radio while in communication with the second wireless device on the wireless link in the second radio mode, an indication of one or more channel metrics.

Aspect 13: The method of any of aspects 1 through 12, further comprising: receiving one or more control messages from the second wireless device via the first radio on a second wireless link while operating in the auxiliary radio mode while communicating one or more data packets with the second wireless device via the second radio on the wireless link while operating in the second radio mode.

Aspect 14: The method of any of aspects 1 through 13, further comprising: receiving a set of data packets from the second wireless device via the second radio on the wireless link while operating in the second radio mode; and receiving a subset of the set of data packets from the second wireless device via the first radio on a second wireless link while operating in the auxiliary radio mode.

Aspect 15: The method of any of aspects 1 through 14, further comprising: transmitting one or more data packets to the second wireless device via the first radio on a second wireless link while operating in the auxiliary radio mode while communicating one or more second data packets with the second wireless device via the second radio on the wireless link while operating in the second radio mode.

Aspect 16: The method of any of aspects 1 through 15, further comprising: transitioning, in response to the control signaling, from operation in the second radio mode on a second wireless link to operation in the auxiliary radio mode on the second wireless link; and transitioning, in response to the control signaling, from operation in the auxiliary radio mode on the wireless link to operation in the second radio mode on the wireless link.

Aspect 17: The method of any of aspects 1 through 16, further comprising: receiving, from the second wireless device while operating in the second radio mode on the wireless link, second control signaling that triggers a second transition from the second radio mode on the wireless link to the auxiliary radio mode on the wireless link; and transitioning, in response to the second control signaling, from operation in the second radio mode on the wireless link to operation in the auxiliary radio mode on the wireless link.

Aspect 18: The method of any of aspects 1 through 16, further comprising: transitioning, subsequent to reception of the data packet, from operation in the second radio mode on the wireless link to operation in the auxiliary radio mode on the wireless link.

Aspect 19: The method of any of aspects 1 through 18, further comprising: receiving an indication identifying that the second wireless device is operating in the second radio mode on the wireless link; and transitioning, in response to the identification, from operation in the auxiliary radio mode on the wireless link to operation in the second radio mode on the wireless link.

Aspect 20: The method of any of aspects 1 through 19, further comprising: communicating, on the wireless link while the first wireless device is in the auxiliary radio mode prior to reception of the control signaling, one or more data packets in a message format associated with the auxiliary radio mode Aspect 21: A method for wireless communications at a second wireless device, comprising: receiving, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio; transmitting, to the first wireless device in communication with the second wireless device on the wireless link, control signaling that triggers the transition from the auxiliary radio mode on the wireless link to the second radio mode on the wireless link; and transmitting, to the first wireless device via the second radio on the wireless link subsequent to transmission of the control signaling, a data packet in accordance with the one or more parameters.

Aspect 22: The method of aspect 21, wherein transmitting the control information comprises: transmitting the control signaling in a message format associated with the auxiliary radio mode, the one or more parameters comprising the message format.

Aspect 23: The method of any of aspects 21 through 22, wherein receiving the indication of the one or more parameters comprises: receiving an indication of a delay associated with the transition, transmission of the data packet being at a time subsequent to transmission of the control signaling by at least the delay.

Aspect 24: The method of aspect 23, further comprising: receiving, from the first wireless device, an indication that the auxiliary radio mode is associated with the second radio being in a sleep mode, the delay being associated with a transition of the second radio from the sleep mode.

Aspect 25: The method of aspect 23, further comprising: receiving, from the first wireless device, an indication that the auxiliary radio mode is associated with the second radio operating on a second wireless link, the delay being associated with a transition of the second radio from the second wireless link to the wireless link.

Aspect 26: The method of any of aspects 23 through 25, further comprising: transmitting, to the first wireless device, one or more padding frames during a time period subsequent to transmission of the control signaling corresponding to the delay.

Aspect 27: The method of any of aspects 21 through 26, further comprising: receiving, from the first wireless device on a second wireless link while in communication with the first wireless device on the wireless link, an indication of one or more channel metrics of the wireless link.

Aspect 28: The method of any of aspects 21 through 27, further comprising: transmitting, to the first wireless device, one or more control messages on a second wireless link while communicating one or more data packets with the first wireless device on the wireless link.

Aspect 29: The method of any of aspects 21 through 28, further comprising: transmitting, to the first wireless device, a set of data packets on the wireless link; and transmitting, to the first wireless device, a subset of the set of data packets on a second wireless link.

Aspect 30: The method of any of aspects 21 through 29, further comprising: receiving one or more data packets from the first wireless device on a second wireless link while communicating one or more second data packets with the first wireless device on the wireless link.

Aspect 31: An apparatus for wireless communications at a first wireless device, comprising a processor; memory coupled with the processor; and instructions stored in the memory and executable by the processor to cause the apparatus to perform a method of any of aspects 1 through 20.

Aspect 32: An apparatus for wireless communications at a first wireless device, comprising at least one means for performing a method of any of aspects 1 through 20.

Aspect 33: A non-transitory computer-readable medium storing code for wireless communications at a first wireless device, the code comprising instructions executable by a processor to perform a method of any of aspects 1 through 20.

Aspect 34: An apparatus for wireless communications at a second wireless device, comprising a processor; memory coupled with the processor; and instructions stored in the memory and executable by the processor to cause the apparatus to perform a method of any of aspects 21 through 30.

Aspect 35: An apparatus for wireless communications at a second wireless device, comprising at least one means for performing a method of any of aspects 21 through 30.

Aspect 36: A non-transitory computer-readable medium storing code for wireless communications at a second wireless device, the code comprising instructions executable by a processor to perform a method of any of aspects 21 through 30.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (such as waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (such as a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrases "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   one or more processors;
   one or more memories coupled with the one or more processors; and
   instructions stored in the one or more memories and executable by the one or more processors to cause the apparatus to:
   transmit, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, the one or more parameters indicative of whether the auxiliary radio mode supports both reception and transmission or reception only, and the one or more parameters indicative of a transition time delay from operation in the auxiliary radio mode in accordance with whether the auxiliary radio mode supports both reception and transmission or reception only;
   receive, from a second wireless device in communication with the first wireless device via the first radio on the wireless link, control signaling that triggers the transition; and
   receive, from the second wireless device via the second radio on the wireless link while the first wireless device is in the second radio mode in response to the control signaling, a data packet in accordance with the one or more parameters.

2. The apparatus of claim 1, wherein the instructions to receive the control signaling are executable by the one or more processors to cause the apparatus to:
   receive the control signaling in a message format associated with the auxiliary radio mode, the one or more parameters comprising the message format.

3. The apparatus of claim 2, the message format comprising at least one of a physical protocol data unit format or a supported data rate.

4. The apparatus of claim 1, receipt of the data packet being at a time subsequent to reception of the control signaling by at least the transition time delay.

5. The apparatus of claim 4, wherein the instructions are further executable by the one or more processors to cause the apparatus to:
   transmit an indication that the auxiliary radio mode is associated with the second radio being in a sleep mode, the transition time delay being associated with a transition of the second radio from the sleep mode.

6. The apparatus of claim 4, wherein the instructions are further executable by the one or more processors to cause the apparatus to:
   transmit an indication that the auxiliary radio mode is associated with the second radio operating on a second wireless link, the transition time delay being associated with a transition of the second radio from the second wireless link to the wireless link.

7. The apparatus of claim 4, wherein the instructions are further executable by the one or more processors to cause the apparatus to:
   receive, from the second wireless device on the wireless link, padding during a time period subsequent to receipt of the control signaling that corresponds to the transition time delay, the padding being contained in a same packet that contains the control signaling or in a subsequent packet.

8. The apparatus of claim 7, the control signaling comprising a frame check sequence prior to the padding.

9. The apparatus of claim 7, the control signaling comprising a message integrity check prior to the padding.

10. The apparatus of claim 4, wherein the instructions are further executable by the one or more processors to cause the apparatus to:
    transmit, to the second wireless device via the first radio, an acknowledgement message responsive to the control signaling, the transition time delay being associated with transmission of the acknowledgement message via the first radio and having a duration of at least one short interframe space.

11. The apparatus of claim 4, wherein the instructions are further executable by the one or more processors to cause the apparatus to:

transmit, to the second wireless device via the second radio, an acknowledgement message responsive to the control signaling, the transition time delay being associated with transmission of the acknowledgement message via the second radio and having a duration of at least a plurality of short interframe spaces, a transmission time of the acknowledgement message, and a preamble duration.

12. The apparatus of claim 1, wherein the instructions are further executable by the one or more processors to cause the apparatus to:
   scan, via the first radio while in communication with the second wireless device on the wireless link in the second radio mode, a plurality of channels; and
   perform, via the first radio, an association procedure with a third wireless device via a channel of the plurality of channels responsive to the scan of the plurality of channels.

13. The apparatus of claim 1, wherein the instructions are further executable by the one or more processors to cause the apparatus to:
   transmit, via the first radio while in communication with the second wireless device on the wireless link in the second radio mode, an indication of one or more channel metrics.

14. The apparatus of claim 1, wherein the instructions are further executable by the one or more processors to cause the apparatus to:
   receive one or more control messages from the second wireless device via the first radio on a second wireless link while operating in the auxiliary radio mode while communicating one or more data packets with the second wireless device via the second radio on the wireless link while operating in the second radio mode.

15. The apparatus of claim 1, wherein the instructions are further executable by the one or more processors to cause the apparatus to:
   receive a set of data packets from the second wireless device via the second radio on the wireless link while operating in the second radio mode; and
   receive a subset of the set of data packets from the second wireless device via the first radio on a second wireless link while operating in the auxiliary radio mode.

16. The apparatus of claim 1, wherein the instructions are further executable by the one or more processors to cause the apparatus to:
   transmit one or more data packets to the second wireless device via the first radio on a second wireless link while operating in the auxiliary radio mode while communicating one or more second data packets with the second wireless device via the second radio on the wireless link while operating in the second radio mode.

17. The apparatus of claim 1, wherein the instructions are further executable by the one or more processors to cause the apparatus to:
   transition, in response to the control signaling, from operation in the second radio mode on a second wireless link to operation in the auxiliary radio mode on the second wireless link; and
   transition, in response to the control signaling, from operation in the auxiliary radio mode on the wireless link to operation in the second radio mode on the wireless link.

18. The apparatus of claim 1, wherein the instructions are further executable by the one or more processors to cause the apparatus to:
   receive, from the second wireless device while operating in the second radio mode on the wireless link, second control signaling that triggers a second transition from the second radio mode on the wireless link to the auxiliary radio mode on the wireless link; and
   transition, in response to the second control signaling, from operation in the second radio mode on the wireless link to operation in the auxiliary radio mode on the wireless link.

19. The apparatus of claim 1, wherein the instructions are further executable by the one or more processors to cause the apparatus to:
   transition, subsequent to reception of the data packet, from operation in the second radio mode on the wireless link to operation in the auxiliary radio mode on the wireless link.

20. The apparatus of claim 1, wherein the instructions are further executable by the one or more processors to cause the apparatus to:
   receive an indication identifying that the second wireless device is operating in the second radio mode on the wireless link; and
   transition, in response to the identification, from operation in the auxiliary radio mode on the wireless link to operation in the second radio mode on the wireless link.

21. The apparatus of claim 1, wherein the instructions are further executable by the one or more processors to cause the apparatus to:
   communicate, on the wireless link while the first wireless device is in the auxiliary radio mode prior to reception of the control signaling, one or more data packets in a message format associated with the auxiliary radio mode.

22. The apparatus of claim 21, wherein to communicate the one or more data packets in a message format associated with the auxiliary radio mode, the instructions are further executable by the one or more processors to cause the apparatus to:
   transmit the one or more data packets, wherein the one or more parameters indicate the auxiliary radio mode supports both reception and transmission.

23. An apparatus for wireless communications at a second wireless device, comprising:
   one or more processors;
   one or more memories coupled with the one or more processors; and
   instructions stored in the one or more memories and executable by the one or more processors to cause the apparatus to:
      receive, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, the one or more parameters indicative of whether the auxiliary radio mode supports both reception and transmission or reception only, and the one or more parameters indicative of a transition time from operation in the auxiliary radio mode in accordance with whether the auxiliary radio mode supports both reception and transmission or reception only;

transmit, to the first wireless device in communication with the second wireless device on the wireless link, control signaling that triggers the transition; and transmit, to the first wireless device via the second radio on the wireless link subsequent to transmission of the control signaling, a data packet in accordance with the one or more parameters.

24. The apparatus of claim 23, wherein the instructions to transmit the control signaling are executable by the one or more processors to cause the apparatus to:

transmit the control signaling in a message format associated with the auxiliary radio mode, the one or more parameters comprising the message format.

25. The apparatus of claim 23, wherein the instructions to receive the indication of the one or more parameters are executable by the one or more processors to cause the apparatus to:

receive an indication of a transition time delay associated with the transition, transmission of the data packet being at a time subsequent to transmission of the control signaling by at least the transition time delay.

26. The apparatus of claim 25, wherein the instructions are further executable by the one or more processors to cause the apparatus to:

receive, from the first wireless device, an indication that the auxiliary radio mode is associated with the second radio being in a sleep mode, the transition time delay being associated with a transition of the second radio from the sleep mode.

27. The apparatus of claim 25, wherein the instructions are further executable by the one or more processors to cause the apparatus to:

receive, from the first wireless device, an indication that the auxiliary radio mode is associated with the second radio operating on a second wireless link, the transition time delay being associated with a transition of the second radio from the second wireless link to the wireless link.

28. The apparatus of claim 25, wherein the instructions are further executable by the one or more processors to cause the apparatus to:

transmit, to the first wireless device, one or more padding frames during a time period subsequent to transmission of the control signaling corresponding to the transition time delay.

29. A method for wireless communications at a first wireless device, comprising:

transmitting, at the first wireless device, an indication of one or more parameters associated with a transition from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, the one or more parameters indicative of whether the auxiliary radio mode supports both reception and transmission or reception only, and the one or more parameters indicative of a transition time from operation in the auxiliary radio mode in accordance with whether the auxiliary radio mode supports both reception and transmission or reception only;

receiving, from a second wireless device in communication with the first wireless device via the first radio on the wireless link, control signaling that triggers the transition; and receiving, from the second wireless device via the second radio on the wireless link while the first wireless device is in the second radio mode in response to the control signaling, a data packet in accordance with the one or more parameters.

30. A method for wireless communications at a second wireless device, comprising:

receiving, from a first wireless device, an indication of one or more parameters associated with a transition, at the first wireless device, from operation in an auxiliary radio mode for wireless communications on a wireless link to operation in a second radio mode for the wireless communications on the wireless link, the auxiliary radio mode associated with use of a first radio of the first wireless device and the second radio mode associated with use of a second radio of the first wireless device different from the first radio, the one or more parameters indicative of whether the auxiliary radio mode supports both reception and transmission or reception only, and the one or more parameters indicative of a transition time from operation in the auxiliary radio mode in accordance with whether the auxiliary radio mode supports both reception and transmission or reception only;

transmitting, to the first wireless device in communication with the second wireless device on the wireless link, control signaling that triggers the transition; and transmitting, to the first wireless device via the second radio on the wireless link subsequent to transmission of the control signaling, a data packet in accordance with the one or more parameters.

* * * * *